United States Patent
Petersen et al.

(10) Patent No.: US 12,260,702 B2
(45) Date of Patent: *Mar. 25, 2025

(54) SERVICE WINDOW MESSAGING OF DIFFERENT WIRELESS CONNECTION STATUSES BETWEEN A MOBILE DEVICE AND AN ELECTRONIC GAMING MACHINE

(71) Applicant: IGT, Las Vegas, NV (US)

(72) Inventors: Erik B. Petersen, Sparks, NV (US); Kevin M. Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 7 days.

This patent is subject to a terminal disclaimer.

(21) Appl. No.: 18/404,555

(22) Filed: Jan. 4, 2024

(65) Prior Publication Data

US 2024/0161571 A1  May 16, 2024

Related U.S. Application Data

(63) Continuation of application No. 17/117,852, filed on Dec. 10, 2020, now Pat. No. 11,900,765.

(51) Int. Cl.
   *G07F 17/32* (2006.01)
   *G07F 17/34* (2006.01)
   *H04W 12/50* (2021.01)

(52) U.S. Cl.
   CPC ...... *G07F 17/3223* (2013.01); *G07F 17/3239* (2013.01); *G07F 17/34* (2013.01); *H04W 12/50* (2021.01)

(58) Field of Classification Search
   CPC .. G07F 17/3223; G07F 17/3239; G07F 17/34; H04W 12/50

USPC .......................................................... 463/42
See application file for complete search history.

(56) References Cited

U.S. PATENT DOCUMENTS

| | | |
|---|---|---|
| 7,611,409 B2 | 11/2009 | Muir et al. |
| 8,613,668 B2 | 12/2013 | Nelson et al. |
| 8,961,306 B2 | 2/2015 | LeMay et al. |
| 9,342,955 B2 | 5/2016 | Weber et al. |
| 9,552,693 B1 | 1/2017 | Reeves |
| 9,824,536 B2 | 11/2017 | Shorrock et al. |
| 10,332,344 B2 | 6/2019 | Petersen |
| 11,222,507 B2 | 1/2022 | Petersen |
| 2002/0045474 A1 | 4/2002 | Singer et al. |
| 2008/0076571 A1 | 3/2008 | Frerking |
| 2008/0113803 A1 | 5/2008 | Alderucci |
| 2008/0153581 A1 | 6/2008 | Hedrick |
| 2012/0122585 A1 | 5/2012 | Nguyen |
| 2013/0130777 A1 | 5/2013 | LeMay |
| 2013/0225279 A1 | 8/2013 | Patceg et al. |
| 2013/0303263 A1 | 11/2013 | LeMay |
| 2014/0162768 A1 | 6/2014 | Nelson et al. |
| 2015/0098455 A1 | 4/2015 | Fritsch |
| 2015/0105144 A1 | 4/2015 | Abouchar |
| 2015/0243133 A1 | 8/2015 | Nicholas |
| 2016/0027249 A1 | 1/2016 | Nelson |
| 2016/0098899 A1 | 4/2016 | Page |
| 2016/0125695 A1 | 5/2016 | Nguyen |
| 2017/0011590 A1 | 1/2017 | Nelson |
| 2017/0148269 A1 | 5/2017 | Page |
| 2017/0221306 A1 | 8/2017 | Patceg et al. |

*Primary Examiner* — Ryan Hsu
(74) *Attorney, Agent, or Firm* — Neal, Gerber & Eisenberg LLP

(57) ABSTRACT

A system that utilizes a service window displayed by an electronic gaming machine to indicate to a player different wireless connection statuses of a mobile device.

15 Claims, 10 Drawing Sheets

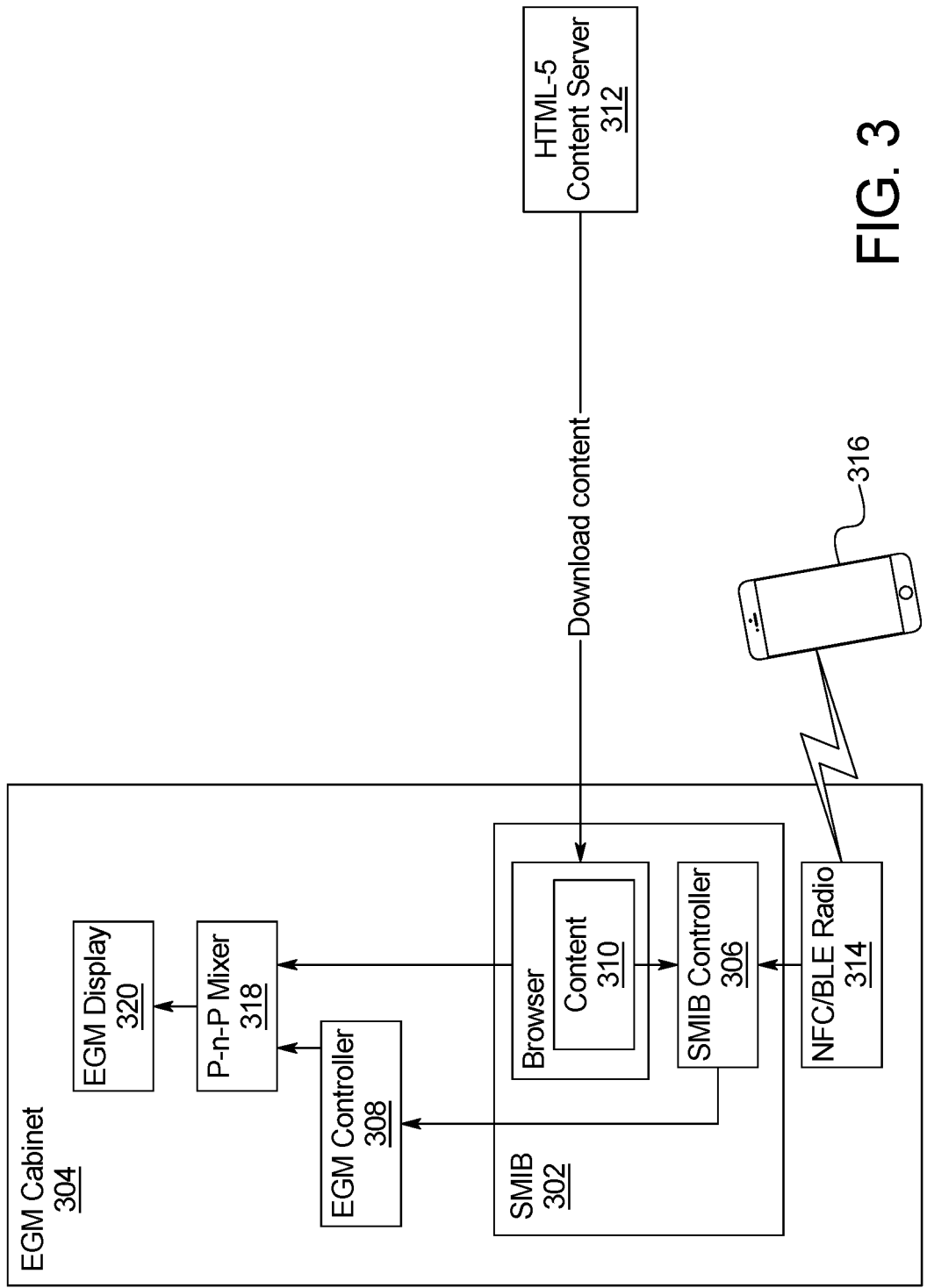

SERVICE WINDOW MESSAGING OF DIFFERENT WIRELESS CONNECTION STATUSES BETWEEN A MOBILE DEVICE AND AN ELECTRONIC GAMING MACHINE

PRIORITY CLAIM

This application is a continuation of, claims priority to and the benefit of U.S. patent application Ser. No. 17/117,852, filed on Dec. 10, 2020, the entire contents of which is incorporated by reference herein.

BACKGROUND

In various embodiments, the system and method of the present disclosure utilize an interface to display different messages to a player regarding different wireless connection statuses between a mobile device and an electronic gaming machine.

Gaming machines may provide players awards in primary games. Gaming machines generally require the player to place a wager to activate the primary game. The award may be based on the player obtaining a winning symbol or symbol combination and on the amount of the wager.

BRIEF SUMMARY

In certain embodiments, the present disclosure relates to a system including a processor; and a memory device that stores a plurality of instructions. When executed by the processor responsive to a determination of a first wireless connection status between a mobile device and the processor, the instructions cause the processor to communicate data which results in a display device displaying, in a service window, a first message associated with the first wireless connection status between the mobile device and the processor. When executed by the processor responsive to a determination of a second, different wireless connection status between the mobile device and the processor, the instructions cause the processor to communicate data which results in the display device displaying, in the service window, a second, different message associated with the second, different wireless connection status between the mobile device and the processor.

In certain embodiments, the present disclosure relates to a player tracking unit including a processor; and a memory device that stores a plurality of instructions. When executed by the processor responsive to a determination of a first wireless connection status between a mobile device and the processor, the instructions cause the processor to communicate data which results in a display device displaying, in a service window, a first message associated with a type of wireless connection between the mobile device and the processor and the first wireless connection status between the mobile device and the processor. When executed by the processor responsive to a determination of a second, different wireless connection status between the mobile device and the processor, the instructions cause the processor to communicate data which results in the display device displaying, in the service window, a second, different message associated with the type of wireless connection between the mobile device and the processor and the second, different wireless connection status between the mobile device and the processor.

In certain embodiments, the present disclosure relates to a method of operating a system. Responsive to a determination of a first wireless connection status between a mobile device and a processor, the method includes displaying, by a display device and in a service window, a first message associated with the first wireless connection status between the mobile device and the processor. Responsive to a determination of a second, different wireless connection status between the mobile device and the processor, the method includes displaying, by the display device and in the service window, a second, different message associated with the second, different wireless connection status between the mobile device and the processor.

Additional features are described herein, and will be apparent from the following Detailed Description and the figures.

BRIEF DESCRIPTION OF THE SEVERAL VIEWS OF THE DRAWINGS

FIG. 3 is an example configuration of the system of the present disclosure.

DETAILED DESCRIPTION

Figure 1:
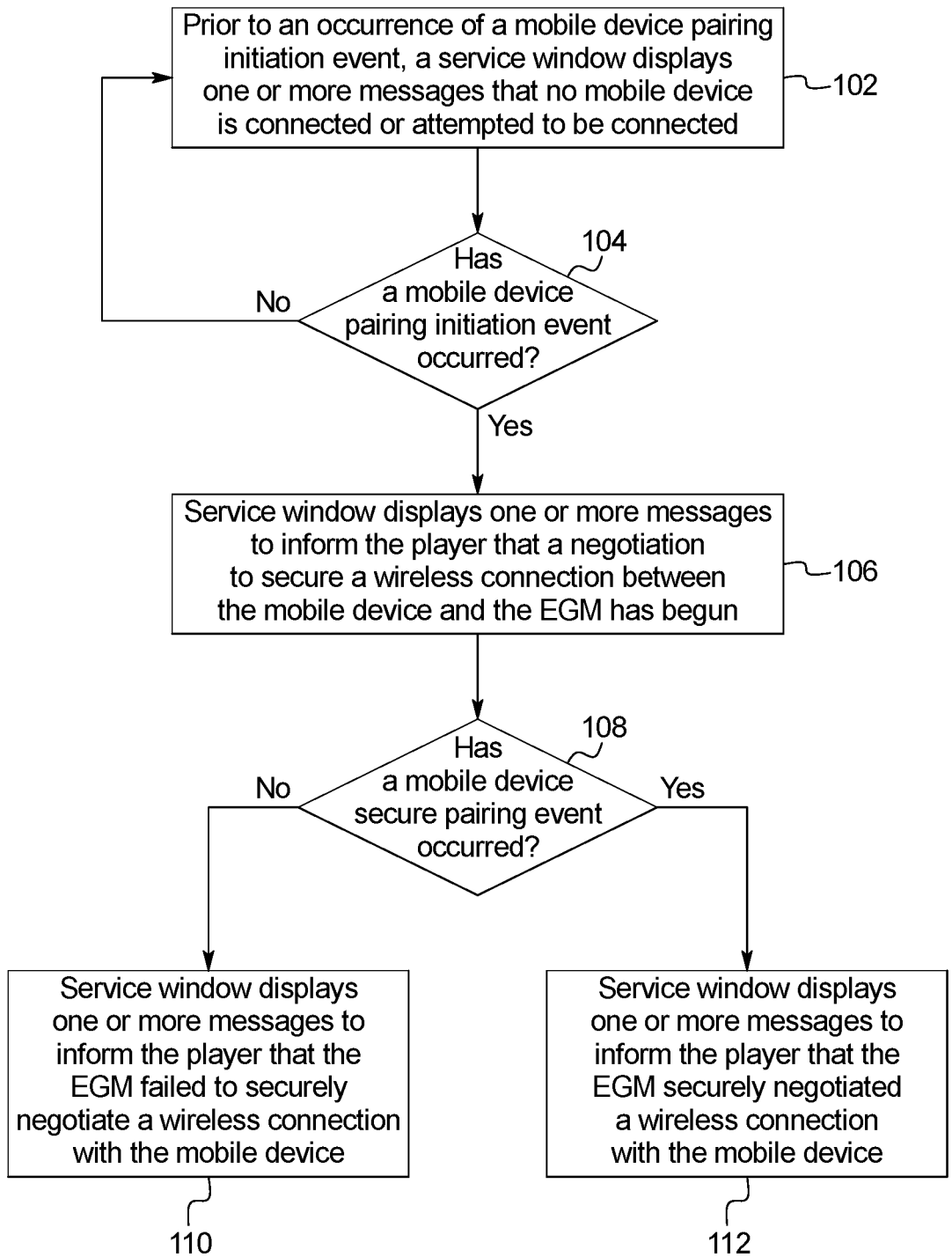
FIG. 1 is a flowchart of an example of the system which controls a service window to indicate the status of a wireless connection of the present disclosure.

In various embodiments, the system of the present disclosure utilizes an interface displayed by a display device of an electronic gaming machine ("EGM") to indicate to a player different wireless connection statuses between a mobile device and the EGM.

In certain embodiments, to enable a player to log into one or more gaming establishment accounts, establish a credit balance on an EGM and/or cashout the credit balance utilizing an application running on a mobile device (and without utilizing any physical instruments associated with the gaming establishment account and/or any physical forms of currency or physical ticket vouchers associated with any forms of currency), the system establishes a wireless linkage or pairing between the mobile device and the EGM (or a component associated with the EGM, such as a player tracking unit coupled to the EGM). In these embodiments, in association with this wireless linkage or pairing, the system of the present disclosure employs an interface (i.e., a service window controlled by a source external from the processor of the EGM) to display one or more messages to the player regarding the progress of such a pairing and any issues arising with such a pairing. For example, the system enhances the content displayed by a service window, such as a remote host controlled service window or a gaming establishment patron management system component controlled service window, to display various wireless connection status messages to better inform the player of a state of a wireless connection between a mobile device and an EGM (or a component associated with the EGM) and/or any changes to the state of such a wireless connection.

More specifically, in various embodiments, the system of the present disclosure employs a service window to display one or more messages/instructions to a player when other avenues of providing such messages/instructions are otherwise unavailable. In these embodiments, information provided via one or more reported messages enable the identification of the type of wireless communication connection between a mobile device and an EGM, and the service window displays information regarding a status of/issues with the wireless communication connection between the mobile device and the EGM, wherein without the employment of the service window messaging, the player would be unaware of a current state of the wireless communication connection between the mobile device and the EGM.

In one such embodiment where near field communication ("NFC") is used as a wireless radio communication standard to communicate data between a mobile device and an EGM, the system of the present disclosure employs a service window controlled by an external source (that has monitors or otherwise receives data regarding the communications between the mobile device and the EGM) to inform the player of specific information regarding a state of and/or issues with a pairing between the EGM and the mobile device. Specifically, since NFC tags employed to facilitate such communications lack any mechanism to display to a player a status of/issues with the communication of data between the mobile device and the EGM, the system of the present disclosure overcomes this technical challenge by utilizing a service window (that is at least partially controlled by a device monitoring or otherwise informed of such communications) to display such information to a player.

In another such embodiment where near field communication is used as a wireless radio communication standard, since an EGM may not be granted control of the information displayed by an NFC wallet application of a mobile device, such as an Apple Wallet™ or Google Pay™ (and thus the EGM may be unable inform the player of a status of/issues with the NFC wallet application), the system of the present disclosure employs a service window controlled by an external source (that monitors or otherwise receives data regarding such NFC wallet applications) to inform the player of a status of/issues with the NFC wallet application. In this embodiment, in view of the inability of the system to cause a third-party NFC wallet application of a mobile device to display any information, the system of the present disclosure overcomes this technical challenge by utilizing a service window to display such information.

In another embodiment where a Bluetooth™ Low Energy ("BLE") connection is used as a wireless communication standard, since an application running on a mobile device may be unable to inform a player why a BLE connection between the mobile device and an EGM was severed, the system of the present disclosure employs a service window controlled by an external source (that monitors or otherwise receives data regarding the interface between the mobile device and the EGM) to inform the player of a status of/issues with a BLE pairing between the EGM and the mobile device. In this embodiment, in view of the inability of a mobile device application to properly explain why a BLE connection fails, the system of the present disclosure overcomes this technical challenge by utilizing a service window (that is at least partially controlled by a device monitoring or otherwise informed of such communications) to display such information and keep the player informed of any BLE connection failures in real time.

Accordingly, in addition to utilizing a service window to enable a player to request one or more services, and/or enable one or more components of a gaming establishment to interact with the player, the system utilizes a service window to display different messages and/or sets of instructions to convey to the player the different statuses of/issues that arise with the wireless connection between the mobile device and the EGM (or a component associated with the EGM, such as a player tracking unit). For example, if a failure occurs in an established wireless connection between a mobile device and an EGM, to keep the player informed of this otherwise imperceptible issue, the system utilizes a Hypertext Markup Language revision 5 ("HTML5") based service window (that employs an HTML5 webpage supporting HTML-style syntax, XHTML-style syntax, and/or one or more application programming interfaces ("APIs")) to display a first message regarding the failed connection and accompanied with instructions for the player to follow to attempt to establish another wireless connection between the mobile device and the EGM. As illustrated by this example and in view of the technical limitations in conveying information to a player regarding the status of a wireless connection (and/or disconnection) between a mobile device and an EGM (or component associated with an EGM), the present disclosure provides the player real-time feedback in the form of one or more messages displayed by a service window, wherein such messages inform the player regarding the wireless connection status between the player's mobile device and the EGM and aid the player with resolving any issues that may arise.

It should be appreciated that while described as utilizing a service window to display information regarding a status of/issues with a wireless communication connection between a mobile device and an EGM (or a component associated with an EGM), any suitable gaming establishment component including a display device operable to display a service window, an interface operable to communicate with a remote host and a wireless interface operable to wirelessly communicate data with a mobile device may be utilized in association with the present disclosure. That is, any suitable device operable to display a service window informing a user of a wireless connection status with a mobile device may be used in accordance with the present disclosure wherein such devices include, but are not limited to, an EGM (including, but not limited to, a slot machine, a video poker machine, a video lottery terminal, a terminal associated with an electronic table game, a terminal associated with a live table game, a video keno machine, a video bingo machine and/or a sports betting terminal (that offers wagering games and/or sports betting opportunities), a kiosk, a component of a gaming establishment patron management system associated with an EGM (e.g., a player tracking unit associated with an EGM) and/or a gaming table component associated with a gaming table (including, but not limited to, a table-level gaming table component and/or a mobile gaming table component).

In various embodiments, prior to enabling a player to take any action related to the gaming system (such as logging a player at an EGM into a player tracking account utilizing a mobile device), a pairing or linkage occurs between the mobile device and the EGM (or a component associated with the EGM, such as a player tracking unit). The pairing or linkage between the mobile device and the EGM occurs via one or more applications being run or executed on the mobile device.

In various embodiments, the mobile device application is a location based application, such as a Passbook-enabled application, which is accessible when the player enters a gaming establishment. In various embodiments, the mobile device application is a location based digital wallet enabled application, such as a Wallet-enabled application, which is accessible when the player enters a gaming establishment and is associated with a digital source of funds. In certain embodiments, the mobile device application is downloaded to the mobile device from an application store. In certain embodiments, the mobile device application is downloaded to the mobile device from one or more websites affiliated with the gaming establishment (which are accessible directly by the player and/or by a link opened when the player scans a QR code associated with the EGM). In certain other embodiments wherein the system employs NFC as a wireless radio communication standard to communicate data between a mobile device and an EGM and wherein the mobile device lacks a pass associated with a player tracking system in a mobile wallet, the system employs suitable NFC card reader hardware to emulate an NFC tag. In these embodiments, by emulating an NFC tag to a mobile device, the NFC card reader hardware redirects the mobile device to a website which assists the player in enrolling in a player tracking program and download a pass into the mobile wallet. It should be appreciated that during the tag emulation period, the NFC card reader cannot read an NFC tag or pass from a mobile wallet such that the system notifies the remote host (or other component of the EGM or gaming establishment patron management system) that causes the service window to display information) that tag emulation is active and the remote host (or other component of the EGM or gaming establishment patron management system) utilizes the service window to display to the player one or more messages informing the player of relevant information.

In certain embodiments, prior to a pairing or linking between the mobile device and the EGM (and assuming that no player tracking card is inserted into the card reader of the player tracking unit and that no gaming session has otherwise commenced), the system causes a display device of the EGM (and/or a display device of a component associated with the EGM, such as a display device of the player tracking unit) to display a service window indicating a non-connected, idle status. For example, as indicated by block 102 of FIG. 1, prior to an occurrence of a mobile device pairing initiation event, a service window displays one or more messages that no mobile device is connected or attempted to be connected. As indicated in FIG. 2A, prior to an occurrence of a mobile device pairing initiation event, such as when the system determines the lack of any data being communicated between a mobile device and the EGM (or a component associated with the EGM), the system displays a gaming interface 202 as well as a service window 204 that, in addition to offering zero, one or more service window features, indicates that no mobile device is currently paired 206*a*.

As illustrated by this example, in certain instances, the service window may be operational while the EGM otherwise operates to provide one or more plays of one or more games. Accordingly, it should be appreciated that in displaying a service window that, amongst other features, informs the player of a status of a wireless connection and/or instructions to establish (or reestablish) a wireless connection, the system may limit resources available to the service window to ensure that a gaming experience is optimal while access to resources of the EGM are granted to one or more external sources. For instance, the cycles of the EGM processor allocated to a remote host to execute service window processes may be limited to ensure a minimal graphically rendered frame rate is maintained on the EGM. In different embodiments, the EGM resources utilized by the service window processes include, but are not limited to, graphic resources of the EGM (i.e., what graphical real estate is available on the display device of the EGM without interfering with the graphics of the games played by the EGM), audio resources of the EGM (i.e., what audio content may be provided by the EGM without interfering with the audio of the games played by the EGM), timing resources available (i.e., has a play of a game of the EGM ended or is beginning), and/or processor processing resources of the EGM. In one such embodiment, access to such resources is based on a priority system configured to maximize an optimal gaming experience for each player.

Following the display of the game interface and the service window informing the player that no mobile device is currently paired with the EGM (or the component associated with the EGM), the system periodically monitors for an initiation of a secure pairing or linking between the mobile device and the EGM (or a component associated with the EGM). For example, as indicated by diamond 104 of FIG. 1, the system periodically determines for an occurrence of a mobile device pairing initiation event. In different embodiments, such a periodic determination occurs at periodic time intervals or upon various events occurring in association with the EGM (e.g., in association with one or more inputs received by the EGM or mobile device application).

In certain embodiments, a player's actions of opening an application on a mobile device and selecting an action to be performed constitutes an initiation of an establishment of a secure connection between the mobile device and the EGM (or a component associated with the EGM). In certain embodiments, the player's actions of causing the mobile device to engage the EGM (or a component associated with the EGM), such as tapping a designated portion of the EGM, constitutes an initiation between the mobile device and the EGM (or a component associated with the EGM).

In certain embodiments, upon a player opening an application on a mobile device and selecting an action to be performed and/or upon the player's actions of causing the mobile device to engage the EGM (or a component associated with the EGM), the system determines if the mobile device application is associated with an active authorization token previously created by the system. In these embodiments, an authorization token is a time-based token which expires after a designated period of time and which is associated with an additional level of player authentication beyond a player's application username and application password. In these embodiments, if the system determines that the application is not associated with an active authorization token previously created by the system, the mobile device application prompts the player to provide identifying information, such as a personal identification number or biometric identifier, wherein if valid, the system creates an authorization token. In these embodiments, the mobile device application stores the provided identifying information as mobile device encrypted data. Following the player providing identifying information, the mobile device application prompts the player to cause the mobile device to engage the EGM (or a component associated with the EGM), such as prompting the player to tap the mobile device to a designated portion of the EGM. It should be appreciated that any reference herein to a player tapping the mobile device to a designated portion of the EGM (or a component associated with the EGM) may or may not include the player pressing a fingerprint scanner (if the mobile device is equipped with such a fingerprint scanner) while concurrently engaging the EGM (or a component associated with the EGM). In other embodiments, the mobile device application verifies the identifying information of the player by communicating with a verification/authentication server over one or more wireless communication protocols, such as WiFi protocol, a cellular communication protocol, to obtain the active authorization token.

If no initiation of a secure pairing or linking between the mobile device and the EGM (or a component associated with the EGM) occurs (i.e., no mobile device pairing initiation event has occurred), the system returns to block 102 and the service window continues to display one or more messages that no mobile device is connected or attempted to be connected while awaiting a subsequent check for an occurrence of a mobile device pairing initiation event.

On the other hand, in certain embodiments, responsive to an occurrence of a mobile device pairing initiation event, the remote host, such as an HTLM5 content server, causes the service window (displayed by a display device of the EGM and/or by a component associated with the EGM, such as by a display device of the player tracking unit) to display one or more wireless connection in process messages pertaining to the status of the establishment of the wireless connection between the mobile device and the EGM (or a component associated with the EGM). In certain other embodiments, responsive to an occurrence of a mobile device pairing initiation event, a slot machine interface board ("SMIB") supported by an EGM (or the EGM) publishes data about the wireless connection status to the service window (displayed by a display device of the EGM and/or by a component associated with the EGM, such as by a display device of the player tracking unit) which displays one or more wireless connection in process messages pertaining to the status of the establishment of the wireless connection between the mobile device and the EGM (or a component associated with the EGM).

Figure 2A:
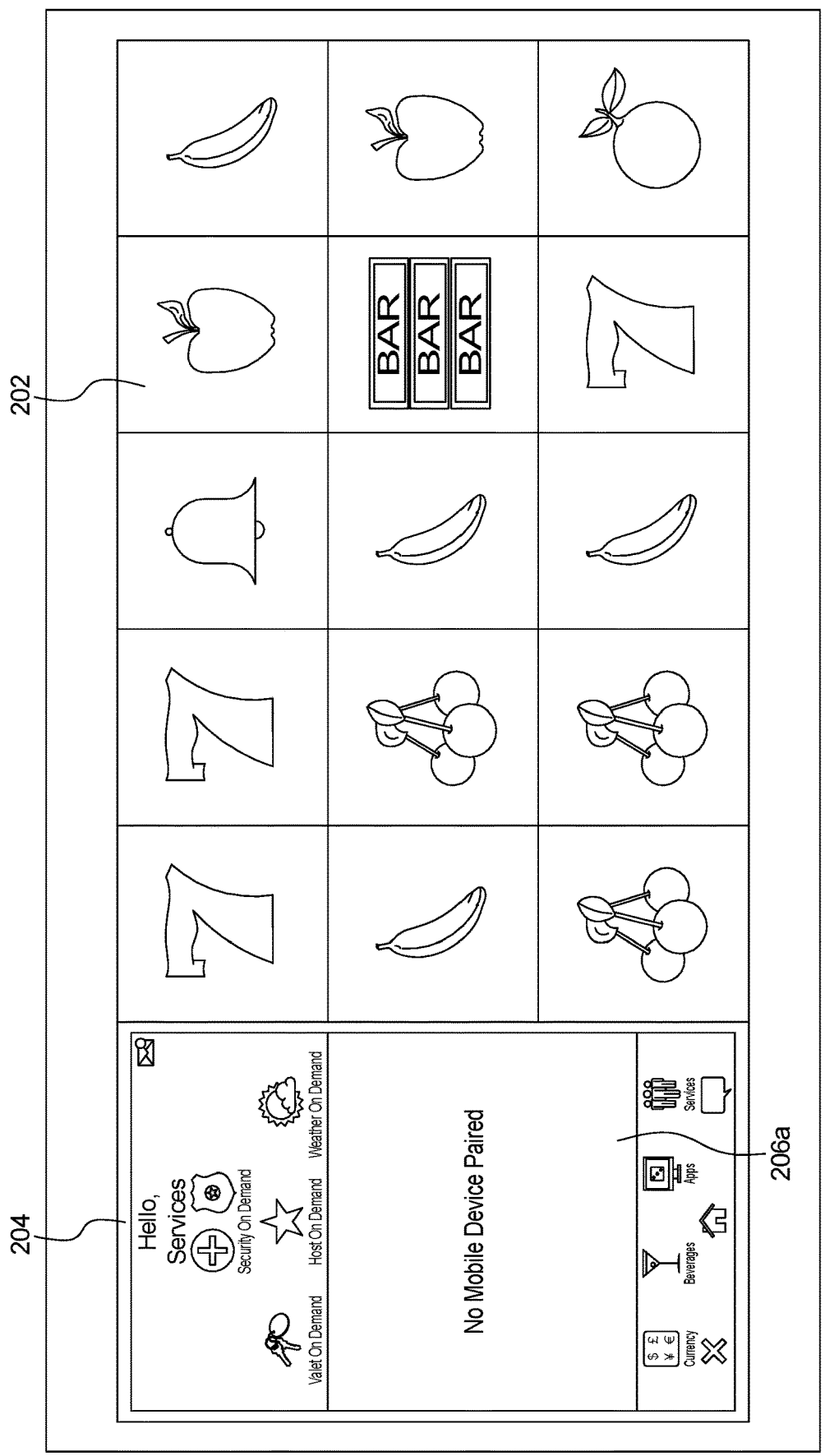
FIGS. 2A, 2B, 2C, 2D, and 2E are example graphical user interfaces displayed by an electronic gaming machine employing a service window to convey the status of a wireless connection between a mobile device and the electronic gaming machine.
Figure 2B:
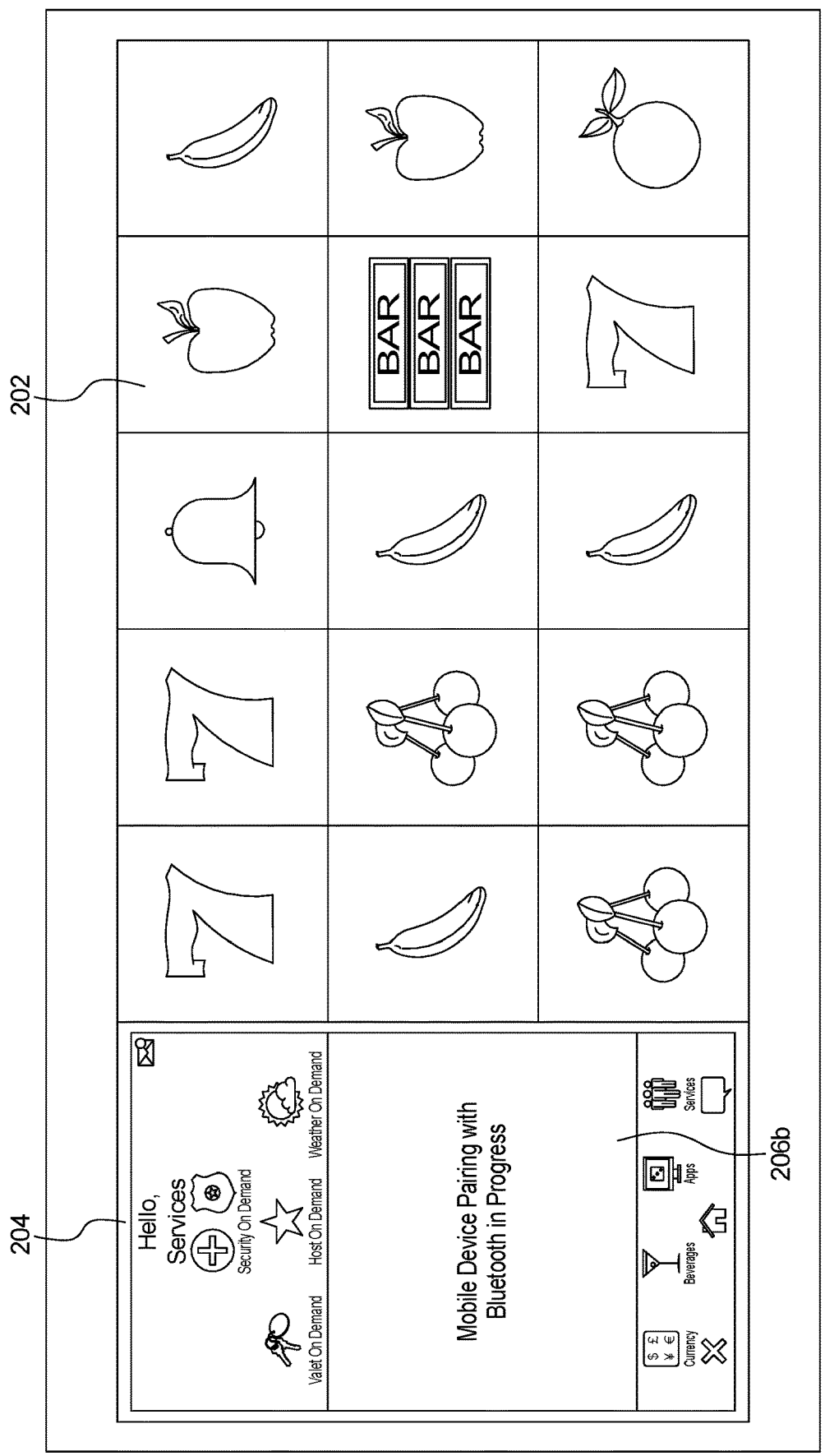

In these embodiments, as seen in block 106 of FIG. 1, upon an occurrence of a mobile device pairing initiation event, the service window displays one or more messages to inform the player that a negotiation (which may take a number of seconds) to secure a wireless connection between the mobile device and the EGM (or a component associated with the EGM, such as the player tracking unit) has begun. For example, as indicated in FIG. 2B, upon an occurrence of a mobile device pairing initiation event which occurs following a player tapping a mobile device to a designated portion of the EGM (or a component associated with the EGM), the system utilizes the service window 204 that displays one or more messages informing the player that a BLE wireless connection is in process 206b.

In certain embodiments, to facilitate the employment of a service window to display information regarding a pairing or linkage between a mobile device and an EGM (or a component associated with the EGM), as seen in FIG. 3, the system includes a SMIB 302 (or other component of a gaming establishment patron management system) supported by an EGM cabinet 304. In addition to a SMIB controller 306 being in communication with an EGM controller 308 (to receive any suitable game data from the EGM (such as, but not limited any amounts wagered, average wager amounts, and/or the time at which these wagers are placed), translate the game data to slot accounting system ("SAS") data and transmit the SAS data to a player tracking system of a gaming establishment management system), the SMIB controller supports an HTML-5 browser 310 that receives content from zero, one or more remote hosts 312, such as an HTML-5 content server.

As seen in FIG. 3, in addition to supporting the SMIB, the EGM cabinet 304 supports at least one wireless communication component, module or interface 314, such as an NFC/BLE radio, which utilizes one or more wireless communication protocols to communicate data to and from a mobile device 316. In these embodiments, such wireless communication protocols include, but are not limited to: Bluetooth™, BLE, one or more cellular communication standards (e.g., 3G, 4G, 5G, LTE), one or more Wi-Fi compatible standards, and one or more short range communication protocols (e.g., an NFC protocol). Such wireless communication components transmits electrical, electromagnetic, or optical signals that carry digital data streams or analog signals representing various types of information.

In operation of certain embodiments, the SMIB controller receives data, via the wireless communication interface, from the mobile device and further receives data from the remote host, wherein the remote host data is associated with one or more displayable messages regarding the type of wireless connection being utilized and information pertaining to the status of such a wireless connection. In these embodiments, the system utilizes a remote host controlled service window to keep the player informed about the status of a wireless connection, wherein depending on the state of the wireless connection status, the remote host communicates one or more messages which are displayed via the remote host controlled service window. In one such embodiment, the remote host monitors the data, if any, communicated between the SMIB (or EGM) and the mobile device and determines, based on such monitored data, one or more messages to be displayed by the remote host controlled service window. In another such embodiment, the SMIB (or EGM) monitors the data, if any, communicated between the SMIB (or EGM) and the mobile device and communicates information to the remote host which determines, based on the communicated information, one or more messages to be displayed by the remote host controlled service window.

In operation of certain other embodiments, the SMIB controller receives data, via the wireless communication interface, from the mobile device, wherein the data is associated with one or more displayable messages regarding the type of wireless connection being utilized and information pertaining to the status of such a wireless connection. In these embodiments, the SMIB (or EGM) monitors the data, if any, communicated between the SMIB (or EGM) and the mobile device and the SMIB (or EGM) communicates, based on the monitored communications, one or more messages to be displayed by the service window. In such embodiments, communication with a remote host is not required to display a wireless connection status message, as at least part of the service window content (e.g., the code which supports displaying a wireless display status message) is locally loaded by the SMIB (or EGM) and/or is part of the content previously downloaded from the remote host (such as when the player navigates from page to page within the service window). That is, in certain embodiments of the system of the present disclosure, any wireless connection status messages displayed by the service window originate by the SMIB (e.g., the HTML5 content is downloaded in the SMIB software image and the SMIB hosts the HTML5 content on a local webserver) independent of any remote host causing the service window to display any wireless connection status messages. Accordingly, the service window content of these embodiments is controlled by the SMIB (or EGM) which in turn may or may not communicate with a remote host.

In certain embodiments, following the determination of one or more messages to be displayed by the service window, the SMIB and EGM controllers operate with any suitable picture-in-picture mixer 318 to cause an EGM display device 320 to display both the service window and the gaming interface. In certain other embodiments wherein the SMIB is associated with a display device independent of the EGM display device, following the determination of one or more messages to be displayed by the service window, the SMIB controller operates to cause the SMIB display device (not shown) to display at least the service window.

Returning to FIG. 1, following the display, via the service window, of the wireless connection in process message pertaining to the status of the establishment of the wireless connection between the mobile device and the EGM (or a component associated with the EGM), the system periodically monitors for the establishment of a secure pairing or linkage. For example, as indicated by diamond 108 of FIG. 1, the system periodically determines for an occurrence of a mobile device secure pairing event. In different embodiments, such a periodic determination occurs at periodic time intervals over a designated period of time.

In certain embodiments, following the player causing the mobile device to engage the EGM, the mobile device application communicates, via a wireless communication protocol, the provided identifying information and the requested action to be performed to the EGM or to a component associated with the EGM. For example, upon the player tapping the mobile device to the player identification device of the player tracking unit or other designated location(s) of the EGM (or otherwise moving the mobile device to within a designated distance from the player identification device of the player tracking unit or other designated locations(s) of the EGM), the mobile device application sends the identifying information and the requested action to a component of a gaming establishment management system located inside the EGM, such as a NexGen® player tracking component of an IGT Advantage® system. NexGen® and IGT Advantage® are trademarks of IGT, the Applicant of the present application.

Following the communication of the identifying information and the requested action to the EGM or a component associated with the EGM, the system determines if the identifying information is valid. For example, a designated gaming system component configured to operate with a player tracking system determines whether the identifying information is valid.

If the system determines that the identifying information is invalid, the system communicates an invalid identifying information response to the mobile device and/or any applicable remote host. For example, an identifying information status message is communicated to the mobile device and/or any applicable remote host which reports whether the identifying information is valid or invalid. The mobile device application then causes the mobile device to display and/or the service window displays one or more messages regarding the invalid identifying information and prompts the player to provide identifying information, such as a personal identification number or biometric identifier.

Figure 2C:
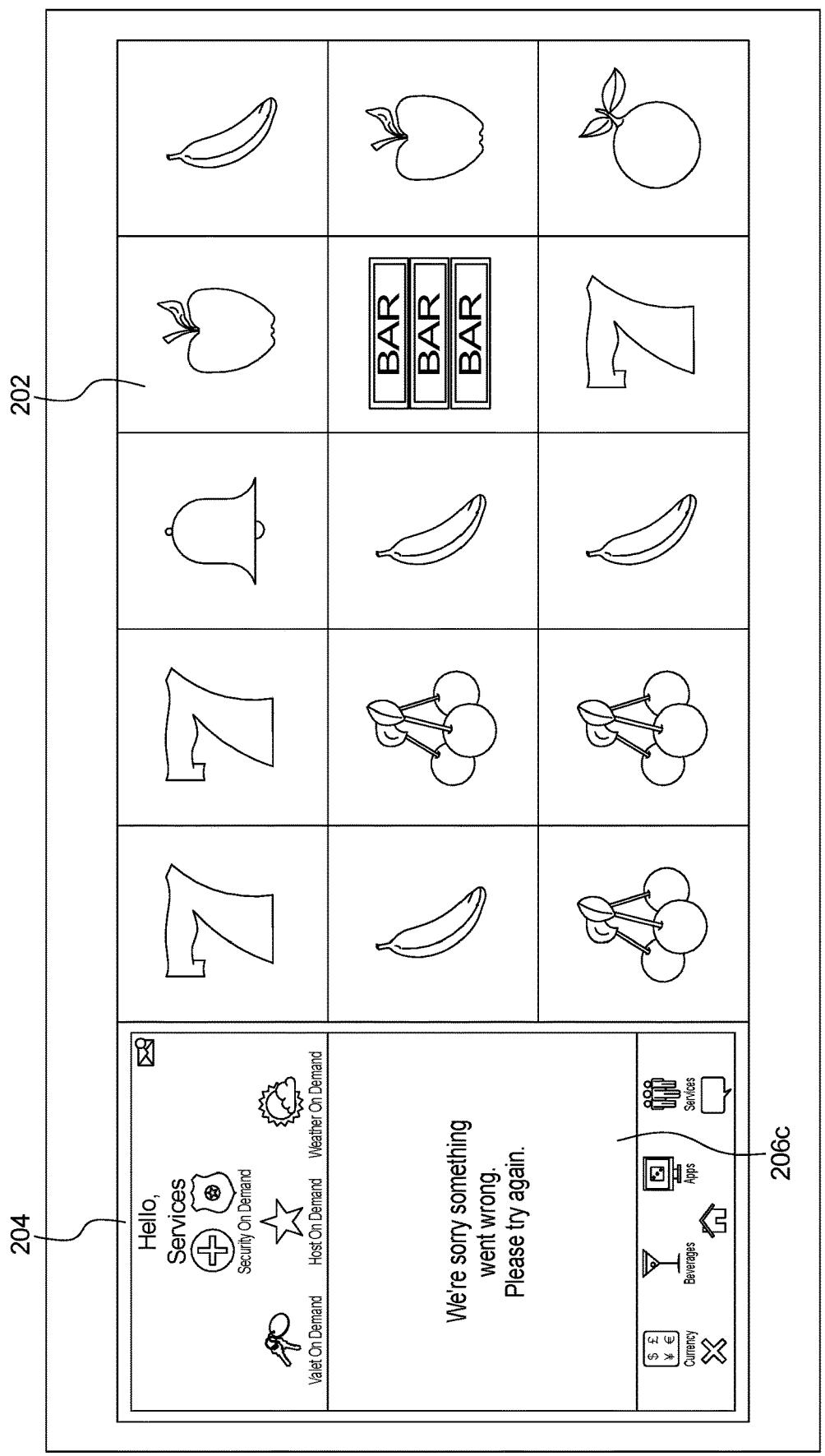

In addition to communicating an invalid identifying information response to the mobile device and/or any applicable remote host (or upon a suitable timeout of no activity after a designated period of time following the mobile device pairing initiation event), the system determines that a mobile device secure pairing event has not occurred. In certain embodiments, if no establishment of a secure pairing between the mobile device and the EGM (or a component associated with the EGM) occurs (i.e., no mobile device secure pairing event has occurred), the remote host, such as an HTLM5 content server, causes the service window (displayed by a display device of the EGM and/or by a component associated with the EGM, such as by a display device of the player tracking unit) to display a message of a failed connection status. In certain other embodiments, if no establishment of a secure pairing between the mobile device and the EGM (or a component associated with the EGM) occurs (i.e., no mobile device secure pairing event has occurred), the SMIB (or the EGM) publishes data about the wireless connection status to the service window (displayed by a display device of the EGM and/or by a component associated with the EGM, such as by a display device of the player tracking unit) which displays a message of a failed connection status. In these embodiments, upon an unsuccessful secure pairing between the mobile device and the EGM (or a component associated with the EGM), as indicated by block 110 of FIG. 1, the service window displays one or more messages to inform the player that the EGM (or a component associated with the EGM) failed to securely negotiate a wireless connection with the mobile device. As indicated in FIG. 2C, upon an occurrence of a failed mobile device pairing event, the system employs service window 204 to display one or more messages informing the player that a wireless connection was not established and instructing the player to again attempt to pair the mobile device with the EGM 206c.

Figure 2D:
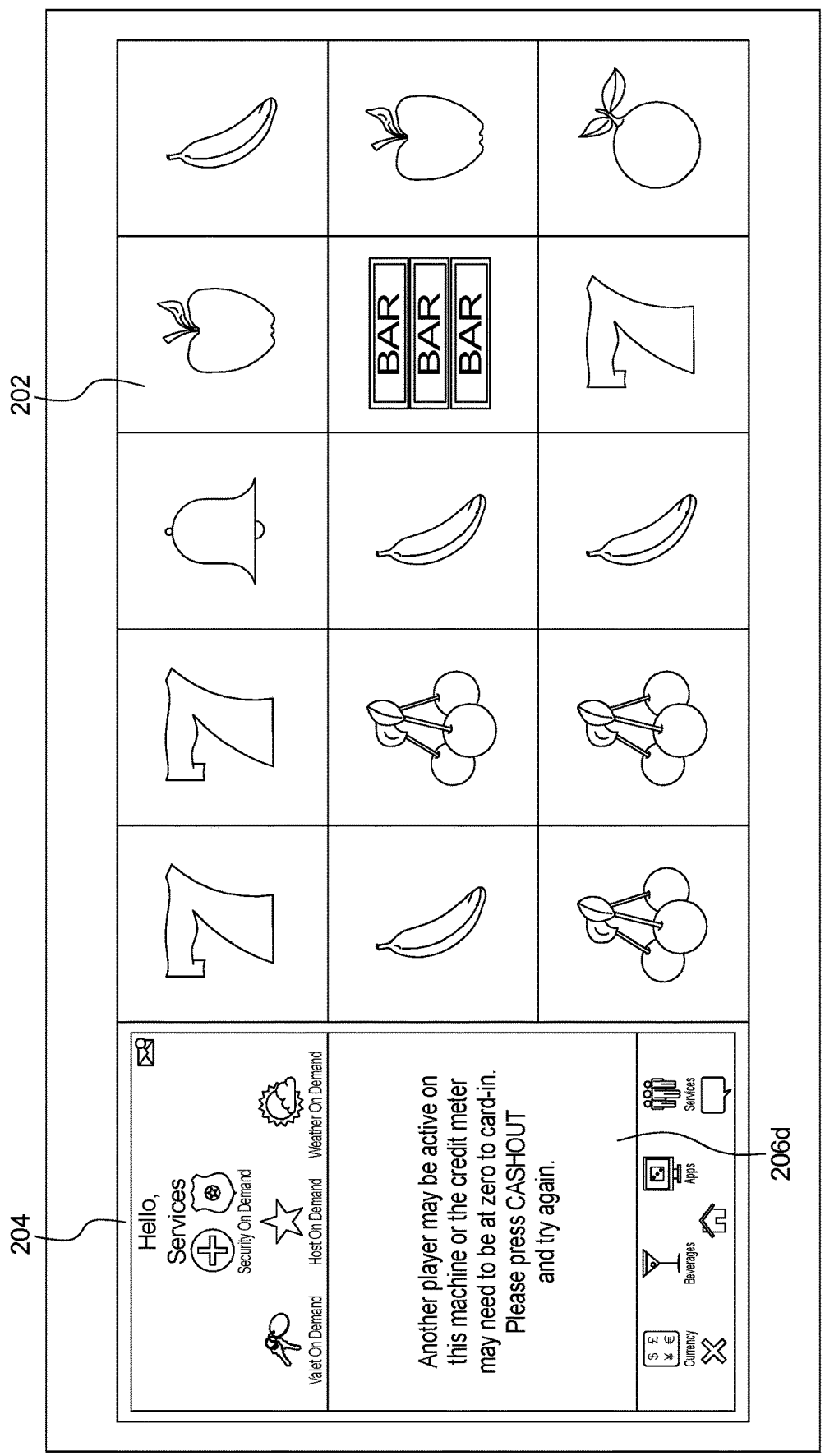

In certain embodiments, in addition to displaying one or more messages informing the player that a wireless connection was not established, the system provides further instructions and/or solutions to the player to enable the player to properly pair (or attempt again to properly pair) the mobile device with the EGM. For example, as seen in FIG. 2D, upon an occurrence of a failed mobile device pairing event, the system employs service window 204 to display one or more messages informing the player of one or more solutions to overcome the previously failed attempt to pair the mobile device with the EGM 206d. It should be appreciated that unlike other mechanisms to indicate to a player whether or not a mobile device is wirelessly connected to an EGM (or a component associated with the EGM) via providing an indication regarding a wireless connection state, the present disclosure represents an enhancement to such prior indications by utilizing a service window to not only inform the player of the wireless connection state, but to further inform the player of one or more avenues to modify the wireless connection state. That is, employing a service window to provide instructions to a player regarding next steps to undertake to establish a wireless connection (or, as described below, reestablish a severed wireless connection) provides players with a level of real-time detail and useful information previously unavailable.

Figure 2E:
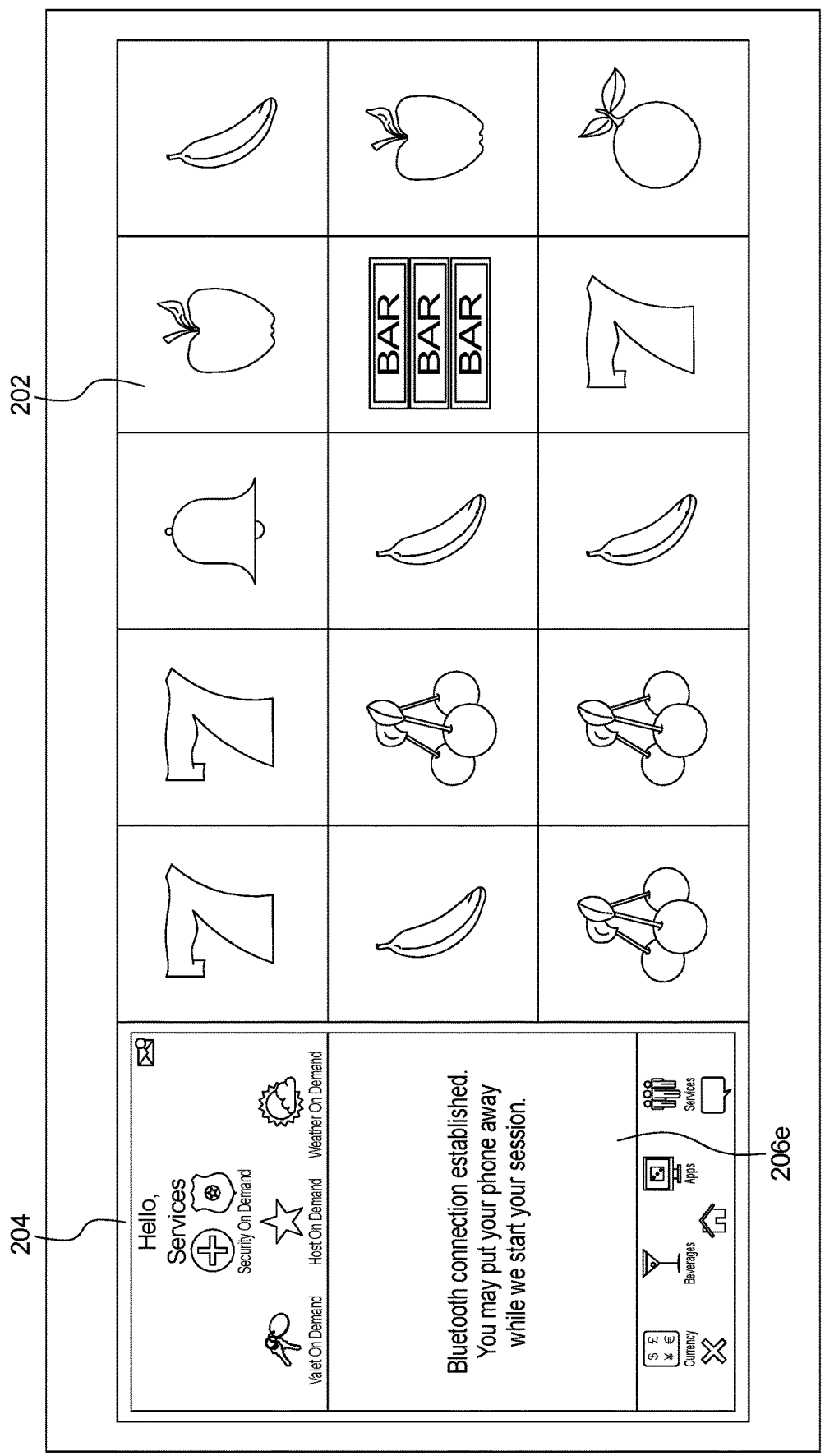

On the other hand, if the system determines that the identifying information is valid and, in certain embodiments, following a determination that the mobile device application is associated with a previously created and stored authentication token, a secure connection is established between the mobile device and the EGM (or a component associated with the EGM, such as a component of a gaming establishment management system located inside the EGM, such as a NexGen® player tracking component of an IGT Advantage® system). For example, upon a successful secure pairing between the mobile device and the EGM (or a component associated with the EGM), as indicated by block 112 of FIG. 1, the service window displays one or more messages to inform the player that the EGM (or a component associated with the EGM) securely negotiated a wireless connection with the mobile device. As indicated in FIG. 2E, upon an occurrence of a successful mobile device pairing event, the system employs service window 204 to display one or more messages informing the player that a wireless connection was established 206e.

In certain embodiments (not shown), following a successful secure pairing between the mobile device and the EGM (or a component associated with the EGM), if the system determines that the secure pairing has been compromised or otherwise lost, the service window displays different messaging to inform the player that the wireless connection between the mobile device and the EGM (or a component associated with the EGM) has been severed and with instructions on how to reestablish, if possible, the wireless connection. In these embodiments, in addition to utilizing a service window, such as a remote host controlled service window or a gaming establishment patron management system component controlled service window, to provide instructions to the player regarding the establishment of a wireless connection between the mobile device and the EGM (or a component associated with the EGM), the system utilizes the service window to inform the player of a severed connection (which the player may not otherwise even be aware of) and provide instructions to the player regarding the reestablishment of such a connection. For example, following a SMIB forcefully closing a BLE connection with a mobile device due to a zombie timeout, the system employs the service window to not only explain to the player what happened, but also to provide helpful information to the player regarding next steps to reestablish the BLE connection with the mobile device.

It should be appreciated that since certain communication protocols are operable to wirelessly connect the mobile device and the EGM (or a component associated with the EGM) from relatively extended distances, such as from 5 inches to 6 inches (12 cm to 16 cm) away, the system of the present disclosure utilizes the service window to display one or more messages associated with another status to inform the player that the mobile device has connected with the EGM (or a component associated with the EGM) but has not initiated the establishment of the secure pairing between the mobile device and the EGM (or a component associated with the EGM). That is, to account for the different distances which the mobile device may wirelessly connect with the EGM (or a component associated with the EGM) prior to the player initiating an establishment of a secure connection, upon an occurrence of an unsecured mobile device pairing event, the service window utilizes different messaging to inform the player that while the mobile device and the EGM (or a component associated with the EGM) are in communication with each other, such a communication is unsecure and a negotiation (which may take a number of seconds) to secure the wireless connection should be initiated.

In these embodiments, after informing the player, via at least the service window, that the mobile device and the EGM (or a component associated with the EGM) are currently in an unsecured wireless connection status, the EGM (or a component associated with the EGM) and/or the mobile device application prompts the player to cause the mobile device to engage the EGM, such as prompting the player to tap the mobile device to a designated portion of the EGM. In these embodiments, if the player proceeds to cause the mobile device to engage the EGM (or a designated portion of the EGM, such as the player tracking unit), such an action constitutes an initiation of an establishment of a secure connection between the mobile device and the EGM (or a component associated with the EGM), which causes the service window to display one or more wireless connection in process messages. As described above, these messages informs the player that a negotiation to secure a wireless connection between the mobile device and the EGM (or a component associated with the EGM, such as the player tracking unit) has begun. On the other hand, if the player does not cause the mobile device to engage the EGM (or a designated portion of the EGM), such as by moving the mobile device a designated distance away from the EGM, the system terminates the unsecure connection with the mobile device and the service window displays one or more messages that no mobile device is connected or attempted to be connected.

Accordingly, the utilization of the service window to display different messages and/or sets of instructions associated with different statuses of the wireless connection between the player's mobile device and the EGM (or a component associated with the EGM, such as the player tracking unit) increases the player's level of comfort in the use of their mobile device with the gaming system. For example, since NFC tags employed to facilitate NFC communications lack any mechanism to display to a player a status of/issues with the communication of data between the mobile device and the gaming establishment component and since the remote host (or other source that controls a service window, such as the SMIB associated with the EGM) has or is otherwise provided visibility to the communications between the mobile device and the gaming establishment component and any issues that may arise, the service window increases the player's level of comfort in the use of their mobile device by informing the player of specific information regarding otherwise imperceptible issues that may arise between a pairing between the gaming establishment component and the mobile device. In another example, since a gaming establishment component, such as an EGM, may not be granted control of the information displayed by a third-party NFC wallet application, the system employs a service window to display information regarding the third-party NFC wallet application to the player, thereby increasing the player's level of comfort in the use of their mobile device by informing the player of a status of/issues with such NFC wallet applications (that would otherwise not be conveyed to the player).

Additionally, informing the player of the progress of the establishment of the wireless connection between the player's mobile device and the EGM (or a component associated with the EGM) provides feedback to the player otherwise unavailable to the player. This feedback increases the security of the system by keeping the player informed of a status of/issues with a pairing between the EGM and the mobile device. For example, since an application running on a mobile device may be unable to inform a player why a BLE connection between the mobile device and the EGM was severed and since the remote host (or other source that controls a service window, such as the SMIB associated with the EGM) has or is otherwise provided visibility to such information, the service window informs the player of a status of/issues with a BLE pairing between the EGM and a mobile device, wherein without such service window, the player may be unaware of any issues in the first place.

Moreover, the utilization a mobile device (to facilitate one or more requested actions as described herein) coupled with the display of different service window provided messages to the player regarding the statuses of the establishment of the wireless connection between the mobile device and the EGM (or a component associated with the EGM) fosters the increased use of mobile devices (to facilitate the transfer of funds to an EGM) which reduces the costs associated with utilizing ticket vouchers (i.e., a bearer instrument redeemable for cash or game play on the EGM) and/or promotional tickets (i.e., an instrument associated with a quantity of promotional credits redeemable for game play on EGM, but not otherwise redeemable for cash) to transfer funds to an EGM. For example, the utilization of ticket vouchers is associated with the labor costs of having to periodically remove a cash box including received ticket vouchers and cash from the EGM, replace the removed cash box with an empty one and refill the blank ticket voucher stacks housed by the EGM. The utilization of such ticket vouchers is further associated with the various labor costs of counting the cash and ticket vouchers removed from the EGM. Specifically, any removed cash is transported to a secure area where one or more individuals are involved in counting and recording the various sums of cash and/or ticket vouchers removed from each EGM. The cash amounts removed from each EGM are reconciled with other information sources, such as from hard meters on the EGM or records from a server that generates and validates ticket vouchers. The reconciliation process ensures the earnings from the EGM are properly taxed. Additionally, the utilization of promotional ticket is associated with the various costs of printing such promotional tickets, mailing such promotional tickets to players prior to such players visiting the gaming establishment and/or staffing a player service desk with personnel to redeem such promotional tickets. The utilization a wirelessly connected mobile device (wherein the wireless connection has been indicated to the player via the service window such that the player feels secure with the status of the connection) to facilitate the transfer of funds to an EGM reduces or eliminates these various costs associated with utilizing ticket vouchers and/or promotional tickets.

In certain embodiments, in addition to utilizing a service window to display one or more messages regarding the different statuses of the wireless connection between a mobile device and an EGM (or a component associated with the EGM, such as the player tracking unit), the system employs a lighted bezel, such as a lighted bezel of an EGM or a lighted bezel of a player tracking unit associated with an EGM, to display a combination of different indications (e.g., colors and/or flashing lights) to the player which are associated with different statuses of the wireless connection between a mobile device and an EGM (or a component associated with the EGM, such as the player tracking unit). In these embodiments, one or more of the different statuses described herein are associated with different colors and/or flashing lights which the lighted bezel output to the player. For example, upon an initiation of the wireless connection between the mobile device and the EGM (or a component associated with the EGM, such as the player tracking unit), a first color is displayed by the lighted bezel which informs the player that a negotiation (which may take a number of seconds) to secure a wireless connection between the mobile device and the EGM (or a component associated with the EGM, such as the player tracking unit) has begun. In this example, upon a successful pairing of the mobile device and the EGM (or a component associated with the EGM), a second, different color is displayed by the lighted bezel which informs the player that the EGM (or a component associated with the EGM) securely negotiated a wireless connection with the mobile device.

In certain embodiments, in addition to utilizing a service window to display one or more messages regarding the different statuses of the wireless connection between a mobile device and an EGM (or a component associated with the EGM, such as the player tracking unit), the system employs secondary lights and/or physical status indicators (which are separate from the lighted bezel) to display a combination of different indications (e.g., colors, flashing lights, movements, messages) to the player which are associated with different statuses of the wireless connection between a mobile device and an EGM (or a component associated with the EGM, such as the player tracking unit). In these embodiments, one or more of the different statuses described herein are associated with different indicators which the secondary lights and/or physical status indicators output to the player. In certain embodiments, in addition to utilizing a service window to display one or more messages regarding the different statuses of the wireless connection between a mobile device and an EGM (or a component associated with the EGM, such as the player tracking unit), the system of the present disclosure utilizes different sounds or noises to convey to the player the statuses of the wireless connection between the mobile device and the EGM (or a component associated with the EGM, such as the player tracking unit). In these embodiments, one or more of the different statuses described herein are associated with different sounds or noises which the mobile device, the EGM, or a component associated with the EGM (e.g., the player tracking unit) output to the player. For example, upon an initiation of the wireless connection between the mobile device and the EGM (or a component associated with the EGM, such as the player tracking unit), a first sound is outputted which informs the player that a negotiation (which may take a number of seconds) to secure a wireless connection between the mobile device and the EGM (or a component associated with the EGM, such as the player tracking unit) has begun. In this example, upon a successful pairing of the mobile device and the EGM (or a component associated with the EGM), a second, different sound is outputted which informs the player that the EGM (or a component associated with the EGM) securely negotiated a wireless connection with the mobile device.

In certain embodiments, in addition to utilizing a service window to display one or more messages regarding the different statuses of the wireless connection between a mobile device and an EGM (or a component associated with the EGM, such as the player tracking unit), the system of the present disclosure utilizes different sensory feedbacks to convey to the player the statuses of the wireless connection between the mobile device and the EGM (or a component associated with the EGM, such as the player tracking unit). In these embodiments, one or more of the different statuses described herein are associated with different sensory feedbacks which the mobile device, the EGM, or a component associated with the EGM (e.g., the player tracking unit) provide to the player. For example, upon an initiation of the wireless connection between the mobile device and the EGM (or a component associated with the EGM, such as the player tracking unit), the mobile device vibrates for a first duration and/or in a first pattern to inform the player that a negotiation (which may take a number of seconds) to secure a wireless connection between the mobile device and the EGM (or a component associated with the EGM, such as the player tracking unit) has begun. In this example, upon a successful pairing of the mobile device and the EGM (or a component associated with the EGM), the mobile device vibrates for a second duration and/or in a second, different pattern to inform the player that the EGM (or a component associated with the EGM) securely negotiated a wireless connection with the mobile device.

It should be appreciated that in addition to the above-described different service window messages employed to convey to the player the status of establishing a wireless connection between the mobile device and an EGM (or a component associated with the EGM), the service window is further operable to display additional messages to convey to the player other conditions which may or may not be satisfied. For example, the service window displays a message when an established wireless connection has occurred between the mobile device and the EGM (or a component associated with the EGM) but the EGM is not currently being played (and thus the player is not eligible to obtain certain loyalty awards or gaming establishment comps which require eligibility). Additionally, the service window displays another message when no wireless connection has occurred between the mobile device and the EGM (or a component associated with the EGM) and no player tracking card is properly inserted into the card reader of the player tracking unit, but the EGM is currently being played (and thus the player is not eligible to obtain certain loyalty awards or gaming establishment comps which require eligibility). Additionally, the service window displays another message when no wireless connection has occurred between the mobile device and the EGM (or a component associated with the EGM), no player tracking card is properly inserted into the card reader of the player tracking unit and the EGM is not currently being played (and thus the player is not eligible to obtain certain loyalty awards or gaming establishment comps which require eligibility).

In various embodiments, as indicated above, in addition to employing a service window to convey to a player enhanced information regarding the status of one or more communications between a mobile device and an EGM, the system employs the service window to offer one or more available services. In different embodiments, the available services include, but are not limited to: ordering a drink, making a reservation at a restaurant, modifying a reservation at a restaurant, making entertainment reservations, modifying entertainment reservations, learning information about various hotels, gaming establishments, restaurants, entertainment and/or travel services, making a reservation to play a particular EGM, modifying a reservation to play a particular EGM, accessing a gaming establishment resort account, such as a cashless wagering account and/or a gaming establishment retail account, transferring funds (either as cashless credits, non-cashable credits, promotional funds) from one gaming establishment account to another gaming establishment account, enrolling in a player tracking system (i.e., a loyalty program), logging a player into a gaming establishment loyalty account, such as a player tracking system account, logging a player out of a gaming establishment loyalty account, redeeming comps associated with a player tracking system, checking a quantity of player tracking points, updating the user's information, redeeming qualified promotions or bonuses, purchasing a lottery ticket, purchasing a sporting event wagering ticket, communicating with another user, communicating with a host or gaming establishment employee, reporting a malfunction of an EGM, calling for service of an EGM, searching for a specific player/EGM, joining a tournament, joining a progressive event, forming a group with one or more other players, modifying the function of at least one setting of an EGM (such as, but not limited to, modifying an auto-play setting, a double-up setting, a value selection setting, a payline selection setting, a wager selection setting, a multi-play selection setting, a volume selection setting), choosing a game to play, storing one or more games as favorites, rating a game, browsing information pertaining to the different games available (such as, but not limited to: pay table information, pay screen information, game rule information, game type information, scatter pay information, winning combination information, historical game pay statistics), accessing a score card of accomplished events, accessing a tournament leader board, displaying one or more progressive award pool values, displaying one or more mystery bonus pool values, displaying and playing a delivery game after the player wins a mystery award and/or selecting a favorite award to play for. It should be appreciated that any suitable service available in association with one or more gaming establishment components may be accessed via the service window of the present disclosure.

Utilizing Paired Mobile Device Application at EGM

In various embodiments, after pairing the mobile device with the EGM (or a component associated with the EGM) and utilizing different messages displayed by a service window to convey to the player the different wireless connection statuses associated with this pairing, the mobile device application communicates one or more requested actions to be performed to the EGM. As described below, such requested actions generally pertain to an action associated with a player account, and/or an action associated with an initiation of a transfer of funds between an EGM and a gaming establishment account, such as a cashless wagering account or a gaming establishment retail account.

It should be appreciated that while certain data or information pertaining to one or more of the below-described requested actions are communicated from an EGM to a mobile device, such data or information may additionally or alternatively be communicated: (i) from one or more servers to a mobile device via one or more wireless communication protocols, or (ii) from an EGM to one or more servers via one or more wireless communication protocols and then from one or more servers to a mobile device via one or more wireless communication protocols. It should be further appreciated that any functionality or process described herein may be implemented via one or more servers, an EGM, one or more components of a gaming establishment management system associated with the EGM (e.g., a player tracking unit of an EGM), or a mobile device application. For example, while certain data or information described herein is explained as being communicated from an EGM (or a component of an EGM, such as a player tracking unit) to a mobile device via one or more wireless communication protocols, such data or information may additionally or alternatively be communicated from one or more servers to a mobile device via one or more wireless communication protocols. Accordingly: (i) while certain functions, features or processes are described herein as being performed by an EGM, such functions, features or processes may alternatively be performed by one or more servers or one or more mobile device applications or one or more components of a gaming establishment management system associated with the EGM (e.g., a player tracking unit of an EGM), (ii) while certain functions, features or processes are described herein as being performed by one or more mobile device applications, such functions, features or processes may alternatively be performed by one or more servers or one or more EGMs or one or more components of a gaming establishment management system associated with the EGM (e.g., a player tracking unit of an EGM), (iii) while certain functions, features or processes are described herein as being performed by one or more servers, such functions, features or processes may alternatively be performed by one or more EGMs or one or more mobile device applications or one or more components of a gaming establishment management system associated with the EGM (e.g., a player tracking unit of an EGM), and (iv) while certain functions, features or processes are described herein as being performed by one or more components of a gaming establishment management system associated with the EGM (e.g., a player tracking unit of an EGM), such functions, features or processes may alternatively be performed by one or more EGMs or one or more mobile device applications or one or more servers.

Player Accounts

In certain embodiments, the action to be performed includes enabling the player to log into a casino loyalty account, such as a player tracking account, via a wireless communication protocol, utilizing the mobile device application. In certain such embodiments, following the launching of the mobile device application, such as following the player selecting an image associated with an electronic casino loyalty account card stored via a digital wallet application or following the mobile device application retrieving data associated with a player loyalty account stored via a digital wallet application, the mobile device application prompts the player to cause the mobile device to engage the EGM, such as prompting the player to tap the mobile device to a card reader or other designated location(s) of the EGM. After such engagement (or after the launching of the mobile device application if no mobile device to EGM engagement is required), the mobile device application communicates, via a wireless communication protocol, player loyalty account data stored by the mobile device to the EGM. The EGM proceeds with operating with a player loyalty system (i.e., a player tracking system) to log the player into the player loyalty account at that EGM. Thereafter, any game play activity is associated with this player loyalty account (just as if the player would have inserted a physical player tracking card into a player tracking card reader of the EGM).

In certain embodiments, the action to be performed includes enabling the player to log out of a casino loyalty account, such as a player tracking account, via a wireless communication protocol, utilizing the mobile device application. In different embodiments, upon receiving one or more "cash out" inputs from the player, if the system determines that no activity has occurred for a designated amount of time, or if the system determines that another player is attempting to log onto the EGM, the mobile device application facilitates a logging out of the casino loyalty account. Such logging out of the casino loyalty account is associated with a termination of the player's current gaming session which, as described above, corresponds to the system causing the service window to display a first message of the first status that no mobile device is connected (or attempted to be connected) and the EGM is otherwise idle. Specifically, the EGM proceeds with operating with a player loyalty system (i.e., a player tracking system) to log the player out of the player loyalty account at that EGM to complete the player tracking session at the EGM.

In certain embodiments, the action to be performed additionally or alternatively includes enabling the player to log into a cashless wagering account, via a wireless communication protocol, utilizing the mobile device application. In certain such embodiments, following the launching of the mobile device application, such as following the player selecting an image associated with an electronic casino loyalty account card stored via a digital wallet application or following the mobile device application retrieving data associated with a cashless wagering account stored via a digital wallet application, the mobile device application prompts the player to cause the mobile device to engage the EGM, such as prompting the player to tap the mobile device to a card reader or other designated location(s) of the EGM. After such engagement (or after the launching of the mobile device application if no mobile device to EGM engagement is required), the mobile device application communicates, via a wireless communication protocol, player cashless wagering account data stored by the mobile device to the EGM. The EGM proceeds with operating with a cashless wagering system to log the player into a cashless wagering account associated with the player. In one embodiment, the system determines a balance of the cashless wagering account associated with the player and causes the EGM to communicate, via one or more wireless communication protocols, the determined cashless wagering account balance to the mobile device. In another embodiment, the system determines a balance of the cashless wagering account associated with the player and communicates, via one or more wireless communication protocols, the determined cashless wagering account balance to the mobile device.

Fund Transfers

In certain embodiments, the action to be performed additionally or alternatively includes enabling the player to facilitate the transfer of funds from a gaming establishment account, such as a cashless wagering account, to the EGM utilizing the mobile device application. In certain such embodiments, following the launching of the mobile device application, such as following the player selecting an image associated with an electronic casino loyalty account card stored via a digital wallet application or following the mobile device application retrieving data associated with a cashless wagering account stored via a digital wallet application, the mobile device application determines an amount of funds to be transferred from the cashless wagering account to the EGM.

In certain embodiments, the cashless wagering account is associated with one or more external accounts, such as one or more credit card accounts, one or more debit card accounts and/or one or more third-party maintained accounts (i.e., one or more PayPal® accounts). In certain embodiments, the cashless wagering account is associated with a gaming establishment or a group of gaming establishments, wherein the player establishes a cashless wagering account by a deposit of funds (such as at a kiosk as described below) to be subsequently utilized in association with the mobile device application.

In one embodiment, the mobile device application enables the player to select an amount to be transferred from a listing of available amounts of funds to be transferred from the cashless wagering account to the EGM. In different embodiments, the listing of available amounts to be transferred is previously selected by the player, selected by a gaming establishment or selected by a third-party. In certain embodiments, the mobile device application enables the player, a gaming establishment and/or a third-party to modify the listing of available amount of funds. In another embodiment, the mobile device application determines the listing of available amount of funds based on one or more characteristics associated with the player, such as the player's prior amounts transferred, the player's wagering history, and/or the player's status. In another embodiment, the mobile device application determines the listing of available amount of funds based on one or more characteristics associated with the EGM, such as based on the denomination, game type, minimum bet and/or maximum available wager amount of the EGM.

In another embodiment, the mobile device application determines a default amount of funds to be transferred from the cashless wagering account to the EGM. In one such embodiment, the default amount of funds includes the last amount of funds transferred from the cashless wagering account to the EGM. In another such embodiment, the default amount of funds includes the last amount of funds transferred from the EGM to the cashless wagering account. The mobile device application displays to the player such a default amount of funds to be transferred. In different embodiments, the default amount to be transferred is previously selected by the player, selected by a gaming establishment or selected by a third-party. In certain embodiments, the mobile device application enables the player, a gaming establishment and/or a third-party to modify the default amount of funds displayed by the mobile device application. In another embodiment, the mobile device application determines the default amount of funds based on one or more characteristics associated with the player, such as the player's prior amounts transferred, the player's wagering history, the player's credit balance, or the player's status.

In certain embodiments, following the determination of an amount of funds to be transferred from the cashless wagering account to the EGM, the mobile device application prompts the player to cause the mobile device to engage the EGM, such as prompting the player to tap the mobile device to a card reader or other designated location(s) of the EGM. After such engagement (or after the determination of an amount of funds to be transferred if no mobile device to EGM engagement is required), the mobile device application communicates, via a wireless communication protocol, data associated with the determined amount of funds to be transferred from the cashless wagering account to the EGM. The EGM proceeds with operating with a cashless wagering system to log the player into a cashless wagering account associated with the player and request the determined amount of funds to be transferred from the cashless wagering account to the EGM.

In another embodiment, rather than prompting the player to engage the EGM with the mobile device and the subsequent engagement of the EGM with the mobile device, the mobile device application automatically determines to transfer a default amount of funds, such as the last transferred amount of funds, from the cashless wagering account to the EGM. In this embodiment, the mobile device application communicates, via a wireless communication protocol, data associated with the determined amount of funds to be transferred from the cashless wagering account to the EGM. The EGM proceeds with operating with a cashless wagering system to log the player into a cashless wagering account associated with the player and request the determined amount of funds to be transferred from the cashless wagering account to the EGM.

Following the EGM requesting the determined amount of funds, the cashless wagering system determines whether to authorize the transfer of the determined amount of funds. If the cashless wagering system determines not to authorize the determined amount of funds, the cashless wagering system communicates a denial to the EGM and/or the mobile device application, wherein the EGM and/or mobile device application display a denial of fund transfer to the player.

On the other hand, if the cashless wagering system determines to authorize the determined amount of funds, the cashless wagering system updates the cashless wagering account associated with the player and communicates an authorization to the EGM. The cashless wagering system reduces a balance of the cashless wagering account by the reduced amount of funds. The EGM proceeds with updating a credit balance of the EGM to account for the determined amount of funds. In certain embodiments, the EGM further proceeds with communicating a transfer of funds confirmation to the mobile device, wherein the mobile device application displays a confirmation of the transfer of the amount of funds and/or the updated credit balance of the EGM. Such a transfer amount of funds is available for wagering by the player.

In certain embodiments, the action to be performed additionally or alternatively includes automatically transferring funds from a cashless wagering account to the EGM utilizing the mobile device application. In one such embodiment, the gaming system includes an automatic reload feature wherein if a credit balance of the EGM falls below a threshold level, the mobile device automatically transfers an amount of funds from the cashless wagering account to the EGM to facilitate additional wagering opportunities. It should be appreciated that, in certain embodiments, the gaming system enables the player to enable or disable such an automatic reload feature.

In certain embodiments, the action to be performed additionally or alternatively includes enabling the player to transfer funds from a virtual ticket voucher to the EGM utilizing the mobile device application. In these embodiments, the mobile device application is associated with one or more virtual ticket vouchers. In certain embodiments, following the launching of the mobile device application, such as following the player selecting an image associated with an electronic casino loyalty account card stored via a digital wallet application, the mobile device application determines an amount of funds to be transferred to the EGM via the redemption of a virtual ticket voucher. In these embodiments, the mobile device application displays to the player images representing any virtual ticket vouchers associated with the mobile device. The mobile device application enables the player to select one or more images representing one or more virtual ticket vouchers associated with the mobile device. In these embodiments, similar to as described above with respect to the transfer of funds from a cashless wagering account to an EGM via a mobile device application, following the determination of which virtual ticket vouchers are to be transferred from the mobile device application to the EGM, the mobile device application prompts the player to cause the mobile device to engage the EGM. The mobile device application then communicates, via a wireless communication protocol, data associated with the selected virtual ticket voucher to be transferred. The EGM then communicates with one or more servers, such as a virtual ticket voucher server, to request the selected virtual ticket voucher (and more specifically the amount of funds associated with the selected virtual ticket voucher) be transferred from to the EGM. The server then determines whether to authorize the transfer of the selected virtual ticket voucher. If the transfer of the selected virtual ticket voucher is authorized: (i) the server updates a database of virtual ticket vouchers to reflect the redemption of the selected virtual ticket voucher, (ii) the EGM proceeds with updating a credit balance of the EGM to account for the amount of funds associated with the selected virtual ticket voucher, (iii) a transfer of funds confirmation is communicated to and displayed by the mobile device, and (iv) the amount of funds associated with the selected virtual ticket voucher are available for wagering by the player.

In certain other embodiments, following a full or partial depletion of a credit balance of the EGM, the EGM wirelessly communicates with the mobile device and queries the mobile device for the presence of any additional virtual ticket vouchers associated with the mobile device application. That is, when the credit balance of the EGM is empty, when the credit balance of the EGM has less than an amount of credits to repeat a previous wager, when the credit balance of the EGM has less credits than a minimum wager and/or when the credit balance of the EGM is below a designated threshold amount, the EGM communicates with the mobile device to determine if the mobile device application is associated with any additional available virtual ticket vouchers. If no additional virtual ticket vouchers are available, the EGM prompts the player to fund the credit balance of the EGM via another funding avenue of the present disclosure. On the other hand, if at least one virtual ticket voucher is available, the EGM operates with the mobile device to facilitate the transfer of such at least one virtual ticket voucher to the EGM. In one such embodiment, the mobile device application communicates a listing of available virtual ticket vouchers to the EGM. The EGM proceeds with displaying the listing of available virtual ticket vouchers and enables the player to select one or more of the available virtual ticket vouchers to redeem. If the player selects one or more of the available virtual ticket vouchers, the EGM communicates the player's selection to the mobile device and the mobile device application proceeds with transferring such virtual ticket vouchers to the EGM as described herein. It should be appreciated that this embodiment enables a player to utilize a mobile device to facilitate the transfer funds, such as transfer of funds associated with one or more virtual ticket vouchers associated with the mobile device, without having to reengage the EGM with the mobile device.

In certain other embodiments, following a full or partial depletion of a credit balance of the EGM, the EGM wirelessly communicates with the mobile device (or communicates with one or more server which communicate with the EGM) and queries the mobile device for the presence of any additional virtual ticket vouchers associated with the mobile device application. If no additional virtual ticket vouchers are available, the EGM prompts the player to fund the credit balance of the EGM via another funding avenue of the present disclosure. On the other hand, if at least one virtual ticket voucher is available, the mobile device application proceeds with automatically transferring the at least one virtual ticket voucher to the EGM as described herein. It should be appreciated that this embodiment enables a player to automatically transfer funds, such as transfer of funds associated with one or more virtual ticket vouchers associated with the mobile device, via the mobile device without the player having to reengage the EGM with the mobile device and without the player having to prompt either the EGM or the mobile device application to initiate such a transfer. It should be further appreciated that, in certain embodiments, the gaming system enables the player to enable or disable such an automatic "transfer of virtual ticket vouchers" feature.

In another embodiment, the EGM periodically communicates information to the mobile device regarding the status or amount of the credit balance of the EGM. In one such embodiment, based on this communicated information, the mobile device application determines when to alert the player to potentially transfer additional funds to the EGM utilizing the mobile device application. For example, the mobile device application could vibrate the mobile device, or create a sound, which alerts the player to view the mobile device application and select which additional funds to virtually insert into or load on the EGM. In another such embodiment, based on this communicated information, the mobile device application determines when to automatically transfer one or more additional and available virtual ticket vouchers to the EGM.

In certain embodiments, the action to be performed additionally or alternatively includes enabling the player to transfer funds from an EGM to a cashless wagering account facilitated by the mobile device application. That is, the system of this disclosure enables a player to transfer winnings from the EGM back to a cashless wagering account in association with the mobile device application. In certain such embodiments, following the launching of the mobile device application, such as following the player selecting an image associated with an electronic casino loyalty account card stored via a digital wallet application or following the mobile device application retrieving data associated with a cashless wagering account stored via a digital wallet application, and receiving one or more "cash out" inputs from the player, the mobile device application determines an amount of funds to be transferred from the EGM to the cashless wagering account.

In one embodiment, the mobile device application enables the player to select an amount to be transferred from the EGM to the cashless wagering account. In one such embodiment, the mobile device application enables the player to select a portion of the credit balance of the EGM (i.e., less than the entire credit balance) to be transferred from the EGM to the cashless wagering account. In various examples, the mobile device application automatically selects an amount of any winnings (i.e., an amount of the credit balance over the initial credit balance), an amount of winnings over a designated amount, an amount of a last win (i.e., an award amount associated with the last played game) or an amount of a last win over a designated amount (i.e., an award amount associated with the last played game over a designated award amount) to be transferred from the EGM to the cashless wagering account. In another embodiment, the mobile device application determines to transfer the credit balance of the EGM from the EGM to the cashless wagering account.

In certain embodiments, following the determination of an amount of funds to be transferred from the EGM to the cashless wagering account, the mobile device application prompts the player to cause the mobile device to engage the EGM, such as prompting the player to tap the mobile device to a card reader or other designated location(s) of the EGM.

In certain other embodiments, the system determines to facilitate the transfer funds from the EGM to the cashless wagering account independent of any input by the player and/or independent of any engagement between the mobile device and the EGM. In one such embodiment, if the system determines that no activity has occurred for a designated amount of time, as a precautionary measure, the system transfers the credit balance of the EGM from the EGM to the cashless wagering account used to transfer funds to the EGM. In another embodiment, if the system determines that another player is attempting to log onto the EGM, as a precautionary measure, the system transfers the credit balance of the EGM from the EGM to the cashless wagering account used to transfer funds to the EGM. Such transfers of the credit balance to the cashless wagering account is associated with a termination of the player's current gaming session which, as described above, corresponds to the system causing the service window to display a message indicating the first status that no mobile device is connected (or attempted to be connected) and the EGM is otherwise idle.

After any engagement between the mobile device and the EGM (or after the determination of an amount of funds to be transferred if no mobile device to EGM engagement is required), the mobile device application communicates, via a wireless communication protocol, data associated with the determined amount of funds to be transferred from the EGM to the cashless wagering account. The EGM proceeds with operating with a cashless wagering system to log the player into a cashless wagering account associated with the player (or confirm that the player remains logged into the cashless wagering account) and request the determined amount of funds to be transferred from the EGM to the cashless wagering account. Following such a request, the EGM proceeds with updating a credit balance of the EGM to account for the determined amount of funds transferred from the EGM to the cashless wagering account. The cashless wagering system additionally updates the cashless wagering account associated with the player (i.e., the cashless wagering system adds the determined amount of funds to the cashless wagering account) and communicates a confirmation to the EGM. The EGM further proceeds with communicating a transfer of funds confirmation to the mobile device, wherein the mobile device application displays a confirmation of the transfer of the amount of funds and/or the updated credit balance of the EGM. Such a transferred amount of funds is available in the player's cashless wagering account to be transferred to another EGM.

In certain embodiments, as described above, the cashless wagering account is associated with one or more external accounts, such as one or more credit card accounts, one or more debit card accounts and/or one or more third-party maintained accounts (i.e., one or more PayPal® accounts). In certain such embodiments, the gaming system enables a player to transfer an amount of funds to such an external account. For example, after a player utilizes the mobile device application to "cash out" an amount of winnings from the EGM to the cashless wagering account, the system enables the player to proceed with transferring, facilitated by the mobile device application, part or all of the amount of winnings to one or more external accounts.

In certain embodiments, the action to be performed additionally or alternatively includes automatically transferring funds from the EGM to a cashless wagering account utilizing the mobile device application. In one such embodiment, the gaming system includes an automatic "cash out" feature wherein if a credit balance of the EGM reaches above a threshold level, the mobile device automatically transfers an amount of funds from the EGM to the cashless wagering account. Such an automatic "cash out" feature is associated with a termination of the player's current gaming session which, as described above, corresponds to the system causing the service window to display a message indicating the first status that no mobile device is connected (or attempted to be connected) and the EGM is otherwise idle. It should be appreciated that, in certain embodiments, the gaming system enables the player to enable or disable such an automatic "cash out" feature.

It should be appreciated that the EGM to/from mobile device fund data transfers of the present disclosure may occur in addition to or as an alternative from cash-based fund transfers and/or ticket voucher-based fund transfers. In one such embodiment, an EGM of the present disclosure is funded via any of a mobile device fund transfer, a cash-based fund transfer or a ticket voucher-based fund transfer. In another embodiment, a credit balance of an EGM of the present disclosure is cashed out via any of a mobile device fund transfer, a cash-based fund transfer or a ticket voucher-based fund transfer. In another embodiment, an EGM of the present disclosure is funded via a mobile device fund transfer or a cash-based fund transfer (but is not funded via any ticket voucher-based fund transfer). In another embodiment, a credit balance of an EGM of the present disclosure is cashed out via a mobile device fund transfer or a cash-based fund transfer (but is not cashed out via any ticket voucher-based fund transfer). In another embodiment, an EGM of the present disclosure is funded via a mobile device fund transfer or a ticket voucher-based fund transfer (but is not funded via any cash-based fund transfer). In another embodiment, a credit balance of an EGM of the present disclosure is cashed out via a mobile device fund transfer or a ticket voucher-based fund transfer (but is not cashed out via any cash-based fund transfer). In another embodiment, an EGM of the present disclosure is funded via a mobile device fund transfer (but is not funded via a cash-based fund transfer nor a ticket voucher-based fund transfer). In another embodiment, a credit balance of an EGM of the present disclosure is cashed out via a mobile device fund transfer (but is not cashed out via a cash-based fund transfer nor a ticket voucher-based fund transfer).

Securing Transactions Between Mobile Device and EGM

While the facilitation of the transfer of funds to and from an EGM via a mobile device has many advantages described herein, certain security concerns arise when transferring fund data wirelessly between an EGM and a mobile device (or between an EGM and the mobile device via one or more servers). For example, a malicious person may attempt to intercept such a wireless communication and steal the funds being transferred. Such a malicious person may devise electronics, such as an antenna or other electronics placed on or near the EGM to insert their mobile device between a "cash out" input and the mobile device engaging the EGM.

More specifically, when facilitating the transfer of deposited funds and/or an amount of winnings from the EGM to a cashless wagering account via the mobile device application, as described herein a player initiates an engagement of the EGM with the mobile device, such as tapping the mobile device to a card reader or other designated location(s) of the EGM. However, before the engagement of the EGM with the player's mobile device is complete, an intruder utilizes such devised electronics to beat the player to the completion of the engagement. In this example, when the player subsequently actuates a "cash out" button on the EGM, the EGM proceeds with transferring the amount of the credit balance of the mobile device of the intruder. Such a concern is also present when a player attempts to wirelessly transfer funds to an EGM via a mobile device wherein the intruder device intercepts such a transfer and reroutes the funds to the mobile device of the intruder.

In view of these security concerns, in addition to utilizing one or more service window messages as described above, certain embodiments of the present disclosure utilize a time window, such as ten seconds, in association with one or more requested actions. These embodiments further utilize the changing messages displayed by a service window to inform the player of any modification to the wireless connection status. In one such embodiment, after receiving an initiation of an engagement of the EGM with the mobile device, the EGM assigns or otherwise associates a time window with such an engagement. If one mobile device is attempted to be paired with the EGM within the associated time window before an action is requested, the EGM determines that only one mobile device is communicating with the EGM and the EGM proceeds with executing the requested action, such as a requested fund transfer as described herein. On the other hand, if more than one mobile device is attempted to be paired with the EGM within the associated time window before an action is requested, the EGM determines that an intruder device may be present. In such a situation, the EGM cancels the requested action and/or prompts the player to reengage the EGM with the mobile device.

In another such embodiment, after receiving a requested action from the mobile device, the EGM assigns or otherwise associates a time window with such a requested action. Following the requested action, if one mobile device is attempted to be paired with the EGM within the associated time window, the EGM determines that only one mobile device is communicating with the EGM and the EGM proceeds with executing the requested action, such as a requested fund transfer as described herein. On the other hand, following the requested action, if more than one mobile device is attempted to be paired with the EGM within the associated time window, the EGM determines that an intruder device may be present. In such a situation, the EGM cancels the requested action and/or prompts the player to reengage the EGM with the mobile device.

It should be appreciated that in addition to thwarting an isolated attempt by an intruder to intercept a wireless fund transfer, the system is configured to identify if a device is involved in multiple attempted engagements with an EGM over a designated threshold or time window. In this embodiment, such a device may be prohibited from being involved in further wireless fund transfers. For example, if multiple engagements are detected involving a single device within a twenty-four hour period, then that mobile device could be banned from participating in any future engagements. Alternatively, that device could be prevented from participating in engagements for a designated period of time, such as a cooling-off period.

EGM Components

Figure 4:
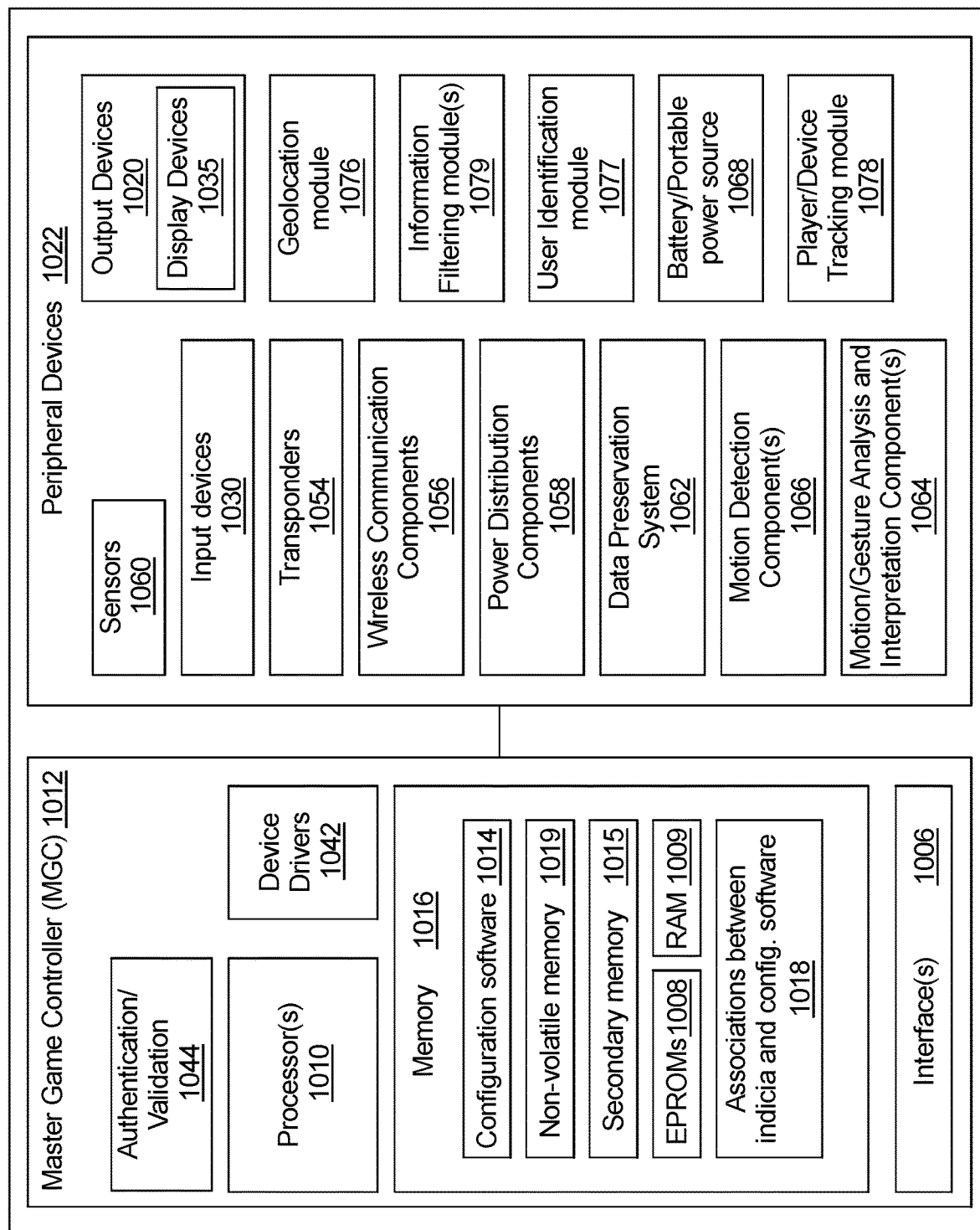
FIG. 4 is a schematic block diagram of one embodiment of an electronic configuration of an example electronic gaming machine of the present disclosure.
Figure 5A:
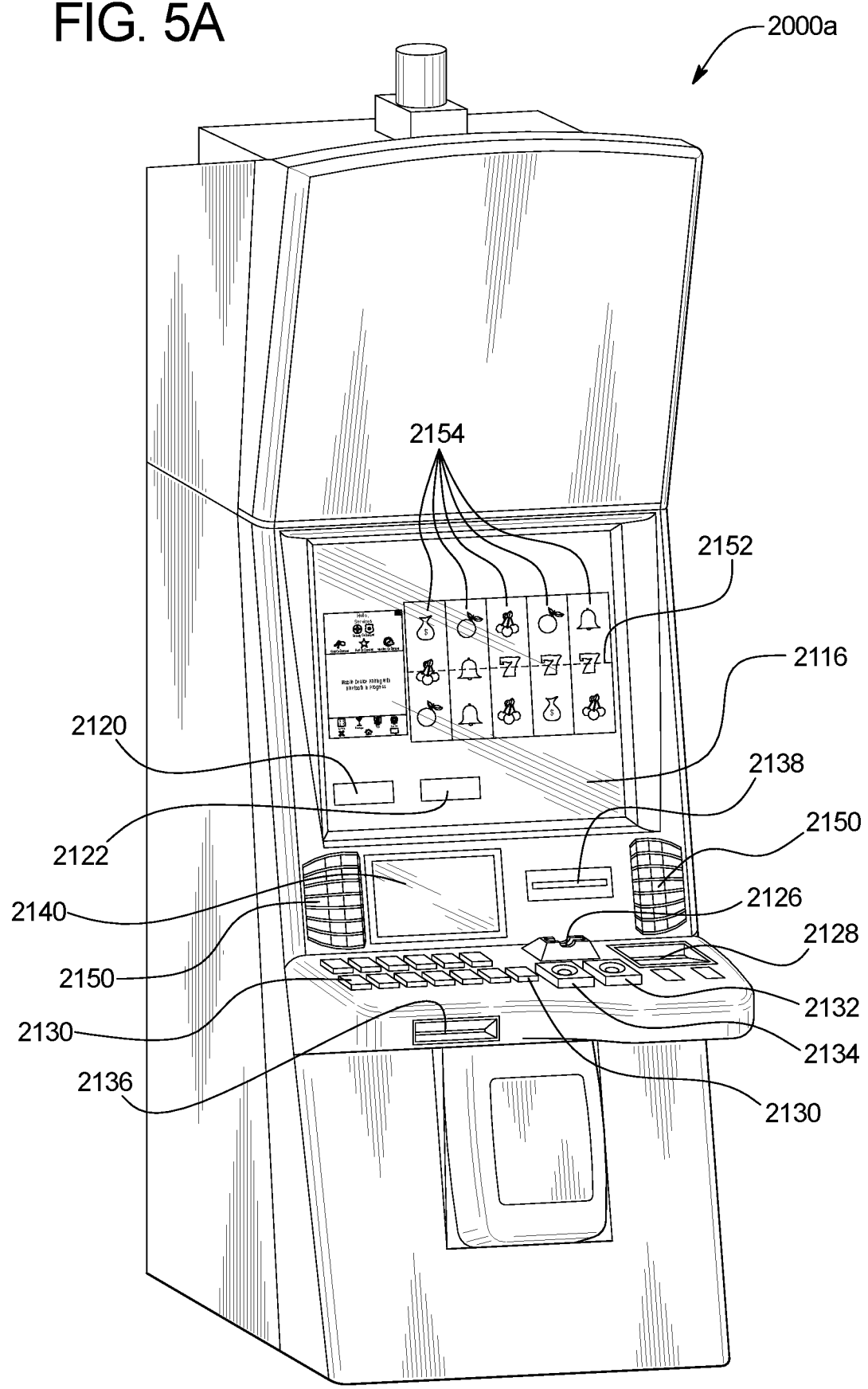
FIGS. 5A and 5B are perspective views of example alternative embodiments of an example electronic gaming machine of the present disclosure.
Figure 5B:
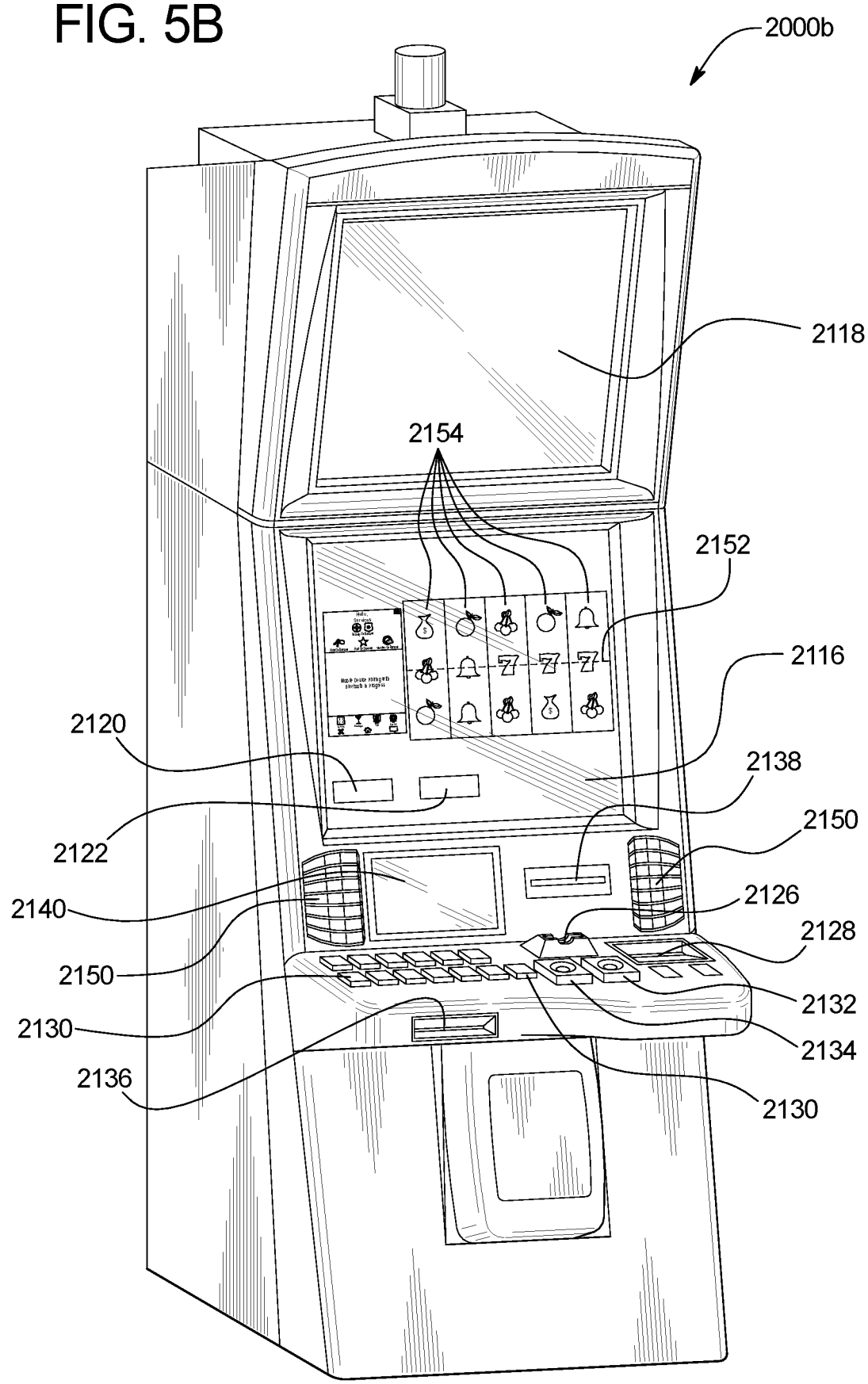

FIG. 4 is a block diagram of an example EGM 1000 and FIGS. 5A and 5B include two different example EGMs 2000a and 2000b. The EGMs 1000, 2000a, and 2000b are merely example EGMs, and different EGMs may be implemented using different combinations of the components shown in the EGMs 1000, 2000a, and 2000b.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000a illustrated in FIG. 5A includes a central display device 2116, a player tracking display 2140, a credit display 2120, and a bet display 2122. The example EGM 2000b illustrated in FIG. 5B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000a and 2000b illustrated in FIGS. 5A and 5B each include a ticket printer and dispenser 2136.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000a and 2000b illustrated in FIGS. 5A and 5B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000a and 2000b illustrated in FIGS. 5A and 5B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 5A and 5B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 5A and 5B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 5A and 5B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 5A and 5B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example EGMs 2000a and 2000b illustrated in FIGS. 5A and 5B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000a and 2000b shown in FIGS. 5A and 5B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM 2000*b* shown in FIG. 4B includes a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

Social Network Integration

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Differentiating Certain EGMs from General Purpose Computing Devices

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

In various embodiments, the processes of the present disclosure are represented by a set of instructions stored in one or more memories and executed by one or more processors. Although certain of the processes of the present disclosure are described with reference to one or more flowcharts, many other processes of performing the acts associated with these illustrated processes may be employed. For example, the order of certain of the illustrated blocks or diamonds may be changed, certain of the illustrated blocks or diamonds may be optional, or certain of the illustrated blocks or diamonds may not be employed.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention claimed is:

1. A slot machine interface board comprising:
    a processor; and
    a memory device that stores a plurality of instructions that, when executed by the processor, cause the processor to:
        responsive to a determination of a first wireless connection status with a mobile device and in association with an inability of the mobile device to output information regarding a failure or a severance of a first wireless connection, communicate data which results in a display device supported by a cabinet of an electronic gaming machine displaying a first alphanumeric message associated with the first wireless connection status with the mobile device, wherein the first alphanumeric message comprises any first action to be undertaken in association with the first wireless connection status and the display of the first alphanumeric message associated with the first wireless connection status with the mobile device occurs after a determination, based at least in part on a usage of a processor of the electronic gaming machine, to allocate at least partial control of the display device to a remote host comprising one of a content server and a patron management server, and responsive to a determination of a second, different wireless connection status with the mobile device and in association with an inability of the mobile device to output information regarding a failure or a severance of a second, different wireless connection, communicate data which results in the display device displaying a second, different alphanumeric message associated with the second, different wireless connection status with the mobile device, wherein the second, different alphanumeric message comprises any second, different action to be undertaken in association with the second, different wireless connection status.

2. The slot machine interface board of claim 1, wherein the first alphanumeric message is associated with an initiation of an establishment of the first wireless connection with the mobile device.

3. The slot machine interface board of claim 1, wherein the first alphanumeric message is associated with a completion of an establishment of the first wireless connection with the mobile device.

4. The slot machine interface board of claim 1, wherein the first alphanumeric message is associated with no wireless connection with the mobile device.

5. The slot machine interface board of claim 1, wherein the first alphanumeric message is associated with a failed establishment of the first wireless connection with the mobile device.

6. The slot machine interface board of claim 1, wherein the first alphanumeric message is associated with an establishment of an unsecure wireless connection with the mobile device.

7. The slot machine interface board of claim 1, wherein the memory device stores a plurality of further instructions that, when executed by the processor responsive to a determination of a third wireless connection status with the mobile device and in association with an inability of the mobile device to output information regarding a failure or a severance of a third wireless connection, cause the processor to communicate data which results in the display device displaying a third alphanumeric message associated with the third wireless connection status with the mobile device, the third alphanumeric message comprising any third action to be undertaken in association with the third wireless connection status, the third wireless connection status being different from the first wireless connection status and the second wireless connection status and the third alphanumeric message being different from the first alphanumeric message and the second alphanumeric message.

8. A system comprising:
a processor; and
a memory device that stores a plurality of instructions that, when executed by the processor, cause the processor to:
responsive to a determination of a first wireless connection status with a mobile device and in association with an inability of the mobile device to output information regarding a failure or a severance of a first wireless connection, communicate data which results in a display device supported by a cabinet of an electronic gaming machine displaying a first alphanumeric message associated with the first wireless connection status with the mobile device, wherein the first alphanumeric message comprises any first action to be undertaken in association with the first wireless connection status and the display of the first alphanumeric message associated with the first wireless connection status with the mobile device occurs after a determination, based at least in part on a usage of a processor supported by the cabinet of the electronic gaming machine, to allocate at least partial control of the display device to a remote host comprising one of a content server and a patron management server, and responsive to a determination of a second, different wireless connection status with the mobile device and in association with an inability of the mobile device to output information regarding a failure or a severance of a second, different wireless connection, communicate data which results in the display device supported by the cabinet of the electronic gaming machine displaying a second, different alphanumeric message associated with the second, different wireless connection status with the mobile device, wherein the second, different alphanumeric message comprises any second, different action to be undertaken in association with the second, different wireless connection status.

9. A method of operating a slot machine interface board, the method comprising:
responsive to a determination of a first wireless connection status with a mobile device and in association with an inability of the mobile device to output information regarding a failure or a severance of a first wireless connection, displaying, by a display device supported by a cabinet of an electronic gaming machine, a first alphanumeric message associated with the first wireless connection status with the mobile device, wherein the first alphanumeric message comprises any first action to be undertaken in association with the first wireless connection status and the display of the first alphanumeric message associated with the first wireless connection status with the mobile device occurs after a determination, based at least in part on a usage of a processor of the electronic gaming machine, to allocate at least partial control of the display device to a remote host comprising one of a content server and a patron management server, and responsive to a determination of a second, different wireless connection status with the mobile device and in association with an inability of the mobile device to output information regarding a failure or a severance of a second, different wireless connection, displaying, by the display device, a second, different alphanumeric message associated with the second, different wireless connection status with the mobile device, wherein the second, different alphanumeric message comprises any second, different action to be undertaken in association with the second, different wireless connection status.

10. The method of claim 9, wherein the first alphanumeric message is associated with an initiation of an establishment of the first wireless connection with the mobile device.

11. The method of claim 9, wherein the first alphanumeric message is associated with a completion of an establishment of the first wireless connection with the mobile device.

12. The method of claim 9, wherein the first alphanumeric message is associated with no wireless connection with the mobile device.

13. The method of claim 9, wherein the first alphanumeric message is associated with a failed establishment of the first wireless connection with the mobile device.

14. The method of claim 9, wherein the first alphanumeric message is associated with an establishment of an unsecure wireless connection with the mobile device.

15. The method of claim 9, further comprising, responsive to a determination of a third wireless connection status with the mobile device and in association with an inability of the mobile device to output information regarding a failure or a severance of a third wireless connection, displaying, by the display device, a third alphanumeric message associated with the third wireless connection status with the mobile device, the third alphanumeric message comprising any third action to be undertaken in association with the third wireless connection status, the third wireless connection status being different from the first wireless connection status and the second wireless connection status and the third alphanumeric message being different from the first alphanumeric message and the second alphanumeric message.

* * * * *